(12) United States Patent
Wei

(10) Patent No.: US 10,389,013 B2
(45) Date of Patent: Aug. 20, 2019

(54) GRATING ASSEMBLY, DISPLAY DEVICE, CONTROL METHOD THEREOF, AND STORAGE MEDIUM

(71) Applicants: BOE Technology Group Co., Ltd., Beijing (CN); Chengdu BOE Optoelectronics Technology Co., Ltd., Chengdu (CN)

(72) Inventor: Dongmei Wei, Beijing (CN)

(73) Assignees: BOE TECHNOLOGY GROUP CO., LTD., Beijing (CN); CHENGDU BOE OPTOELECTRONICS TECHNOLOGY CO., LTD, Sichuan Province (CN)

( * ) Notice: Subject to any disclaimer, the term of this patent is extended or adjusted under 35 U.S.C. 154(b) by 0 days.

(21) Appl. No.: 15/977,403

(22) Filed: May 11, 2018

(65) Prior Publication Data

US 2019/0058243 A1 Feb. 21, 2019

(30) Foreign Application Priority Data

Aug. 21, 2017 (CN) .......................... 2017 1 0720277

(51) Int. Cl.
*H01Q 1/24* (2006.01)
*H04B 5/00* (2006.01)
*G02F 1/1335* (2006.01)

(52) U.S. Cl.
CPC ........... *H01Q 1/243* (2013.01); *G02F 1/1335* (2013.01); *H04B 5/0031* (2013.01); *H04B 5/0037* (2013.01); *H04B 5/0081* (2013.01)

(58) Field of Classification Search
CPC ........ H01Q 1/243; H01Q 1/24; G02F 1/1335; G02F 1/1337; H04B 5/0031; (Continued)

(56) References Cited

U.S. PATENT DOCUMENTS 8,207,026 B2 * 6/2012 Suzawa ............... H01L 27/1288
438/158
10,141,625 B1 * 11/2018 Ryu ........................ H05K 1/181
(Continued)

*Primary Examiner* — Pablo N Tran
(74) *Attorney, Agent, or Firm* — Fay Sharpe LLP

(57) ABSTRACT

The present application relates to a grating assembly, a display device, a control method thereof and a storage medium, in the field of display technology. The grating assembly comprises: a first substrate and a second substrate disposed opposite to each other, and a liquid crystal layer disposed between the first substrate and the second substrate. The first substrate is provided with a power supply electrode on a side adjacent to the liquid crystal layer, and the second substrate is provided with k strip electrodes on a side adjacent to the liquid crystal layer. The k strip electrodes are connected to form a coil. The power supply electrode is configured to receive a first electrical signal, each of the k strip electrodes is configured to receive a second electrical signal, liquid crystals between the power supply electrode and each of the strip electrodes are configured to deflect to form a grating structure after the power supply electrode receives the first electrical signal and each of the strip electrodes receives the second electrical signal, and at least two of the k strip electrodes are further configured to receive a third electrical signal so that the coil formed by the k strip electrodes generates a magnetic field. The present application solves the problem that the relatively high cost of setting up the NFC antenna and helps to reduce the cost.

20 Claims, 27 Drawing Sheets

(58) Field of Classification Search
CPC ...... H04B 5/0037; H04B 5/0081; H04B 5/00; G02B 27/22; G02B 27/26; H04N 13/354; H04N 13/305; H04N 13/312; H04N 13/31; H04N 13/32
See application file for complete search history.

(56) References Cited

U.S. PATENT DOCUMENTS

| | | | | |
|---|---|---|---|---|
| 2017/0219837 A1* | 8/2017 | Gai | ............... | G02F 1/133308 |
| 2018/0364487 A1* | 12/2018 | Yeoh | ............... | G02B 27/44 |
| 2019/0075243 A1* | 3/2019 | Yamazaki | ............... | G06F 1/1616 |

* cited by examiner

GRATING ASSEMBLY, DISPLAY DEVICE, CONTROL METHOD THEREOF, AND STORAGE MEDIUM

This application claims priority to Chinese Patent Application No. 201710720277.5, filed with the State Intellectual Property Office on Aug. 21, 2017 and entitled "GRATING ASSEMBLY, DISPLAY DEVICE, CONTROL METHOD THEREOF, AND STORAGE MEDIUM," the entire contents of which are incorporated herein by reference.

TECHNICAL FIELD

The present application relates to display technology, and more particularly to a grating assembly, a display device, a control method thereof and a storage medium.

BACKGROUND

With the popularization of terminals such as smart phones and smart wearable devices, more and more terminals are equipped with a Near Field Communication (NFC) module so that the terminals can perform NFC-based communication therebetween to realize an identity authentication function, a payment function, etc.

In the related art, the NFC module comprises an NFC chip and an NFC antenna. The NFC chip is disposed inside the terminal. The NFC antenna is disposed on the terminal in an external expansion form. The NFC antenna is connected to the NFC chip. For example, for a smart phone, the NFC antenna is usually disposed on the back of the phone housing or adjacent to the battery. For a smart wearable device, it is usually required to dispose a card slot on the smart wearable device and install a Secure Digital Memory Card (SDMC) or a Subscriber Identity Module (SIM) card with an NFC antenna in the card slot. The NFC antenna comprises a coil. When a current flows in the coil, the current will make the coil generate magnetic field. The magnetic field can be electromagnetically coupled with a magnetic field generated by, the coils of other terminals, so that the two terminals are paired successfully, thereby performing data exchange to realize an authentication function or a payment function.

In the process of implementing the present application, the inventors found that the related technology has at least, the following problems:

an NFC antenna needs to be set up in the form of external expansion in the related art, resulting in that the cost of setting up an NFC antenna is high.

SUMMARY

The present application provide a grating assembly, a display device, a control method thereof and a storage medium. The technical solutions are as follows.

According to a first aspect, a grating assembly is provided, including: a first substrate and a second substrate disposed opposite to each other, and a liquid crystal layer disposed between the first substrate and the second substrate, the first substrate being provided with a power supply electrode on a side adjacent to the liquid crystal layer, the second substrate being provided with k strip electrodes on a side adjacent to the liquid crystal layer, the k strip electrodes being connected to form a coil, k>1, and k being a natural number, wherein the power supply electrode is configured to receive a first electrical signal, each of the k strip electrodes is configured to receive a second electrical signal, liquid crystals between the power supply electrode and each of the strip electrodes are configured to deflect to form a grating structure after the power supply electrode receives the first electrical signal and each of the strip electrodes receives the second electrical signal, and at least two of the k strip electrodes are further configured to receive a third electrical signal so that the coil formed by the k strip electrodes generates a magnetic field.

Optionally, length directions of the k strip electrodes are parallel, the k strip electrodes are arrayed along a first direction, and the first direction intersects with the length direction of each of the k strip electrodes.

Optionally, the first direction is perpendicular to the length direction of each of the k strip electrodes.

Optionally, the grating assembly includes m strip electrode groups arrayed in the first direction, each of the strip electrode groups includes at least one of the strip electrodes, at least one of the strip electrode groups is a strip electrode group formed by a parallel connection of at least two of the strip electrodes, an i-th strip electrode group and a (m+1−i)-th strip electrode group of the m strip electrode groups are different, a first end of the i-th strip electrode group is connected to a first end of the (m+1−i)-th strip electrode group, a second end of the i-th strip electrode group and a second end of the (m+1−i)-th strip electrode group are respectively configured to receive an electrical signal, the electrical signal includes the third electrical signal, m>1, 0<i≤m/2, and both m and i are natural numbers.

Optionally, a j-th strip electrode in the k strip electrodes is different from a (k+1−j)-th strip electrode, a first end of the j-th strip electrode is connected to a first end of the (k+1−j)-th strip electrode, a second end of the j-th strip electrode and a second end of the (k+1−j)-th strip electrode are respectively configured to receive an electrical signal, the electrical signal includes the third electrical signal, 0<j≤k/2, and j is a natural number.

Optionally, the grating assembly includes g strip electrode groups arrayed in the first direction, each of the strip electrode groups includes at least one of the strip electrodes, at least one of the strip electrode groups is a strip electrode group formed by a parallel connection of at least two of the strip electrodes, a first end of a w-th strip electrode group in the g strip electrode groups is connected to a first end of a (w+1)-th strip electrode group, a second end of the (w+1)-th strip electrode group is connected to a second end of the (w+2)-th strip electrode group, a second end of the first strip electrode group and a second end of the g-th strip electrode group in the g strip electrode groups are respectively configured to receive an electrical signal, the electrical signal includes the third electrical signal, g>1, 0<w≤g−2, and both g and w are natural numbers.

Optionally, a first end of a u-th strip electrode in the k strip electrodes is connected to a first end of a (u+1)-th strip electrode, a second end of the (u+1)-th strip electrode is connected to a second end of the (u+2)-th strip electrode, a second end of the first strip electrode in the k strip electrodes and a second end of the k-th strip electrode are respectively configured to receive an electrical signal, the electrical signal includes the third electrical signal, 0<u≤k−2 and u is a natural number.

Optionally, the grating assembly includes n strip electrode groups arrayed in the first direction, each of the strip electrode groups includes at least one of the strip electrodes, at least one of the strip electrode groups is a strip electrode group formed by at least two of the strip electrodes parallel connected, a p-th strip electrode group and a (n+1−p)-th strip electrode groups in the n strip electrode groups are different, the (n+1−p)-th strip electrode group is different from a (p+1)-th strip electrode group, a first end of the p-th strip electrode group is connected to a first end of the (n+1−p)-th strip electrode group, a second end of the (n+1−p)-th strip electrode group is connected to a second end of the (p+1)-th strip electrode group, one end of the n strip electrode groups that is not connected to other strip electrode groups is configured to receive an electrical signal, the electrical signal includes the third electrical signal, n>1, 0<p<n, and n and p are both natural numbers.

Optionally, a q-th strip electrode in the k strip electrodes is different from a (k+1−q)-th strip electrode, the (k+1−q)-th strip electrode is different from the (q+1)-th strip electrode, a first end of the q-th strip electrode is connected to a first end of the (k+1−q)-th strip electrode, a second end of the (k+1−q)-th strip electrode is connected to a second end of the (q+1)-th strip electrode, one end of the k strip electrodes that is not connected to other strip electrodes is configured to receive an electrical signal, the electrical signal includes the third electrical signal, 0<q<k, and the q is a natural number.

Optionally, a first alignment part is disposed in a peripheral region of the first substrate on a side adjacent to the liquid crystal layer, a second alignment part is provided in a peripheral region of the second substrate on a side adjacent to the liquid crystal layer, and the first alignment part and the second alignment part are configured to align the first substrate and the second substrate.

Optionally, a protective layer is respectively provided on the power supply electrode and on the k strip electrodes.

Optionally, the protective layer is made of an inorganic insulating material, and the materials of the power supply electrode and the strip electrode are both semiconductor oxide.

Optionally, the power supply electrode is a plate electrode.

Optionally, the grating assembly is applied to a liquid crystal display device, a distance between any two adjacent strip electrodes is G, each pixel in the liquid crystal display device includes three sub-pixels, each pixel has a width P, a distance between two pupils of human eyes is L, and G, P and L satisfy:

$$G = \frac{2 \times P}{1 + \frac{P}{L}}.$$

According to a second aspect, a display device is provided, including: a control assembly and a grating assembly as claimed in any one of claims 1 to 14, the control assembly being electrically connected to the grating assembly, wherein the control assembly is configured to apply a first electrical signal to a power supply electrode of the grating assembly, and apply a second electrical signal to each of k strip electrodes of the grating assembly, so that liquid crystals between the power supply electrode and each of the strip electrodes deflect to form a grating structure; and the control assembly is further configured to apply a third electrical signal to at least two of the k strip electrodes of the grating assembly so that a coil formed by the k strip electrodes generates a magnetic field.

Optionally, the display device further includes: a display assembly, the control assembly being electrically connected to the display assembly, wherein the control assembly is further configured to control the display assembly to display an image, and the grating structure is configured to modulate the image displayed by the display assembly to obtain a three-dimensional image.

According to a third aspect, a control method for a display device is provided, wherein a control assembly is applied in the display device, the display device further includes a grating assembly, the grating assembly is electrically connected to the control assembly, and the grating assembly includes: a first substrate and a second substrate disposed opposite to each other, and a liquid crystal layer disposed between the first substrate and the second substrate, the first substrate is provided with a power supply electrode on a side adjacent to the liquid crystal layer, the second substrate is provided with k strip electrodes on a side adjacent to the liquid crystal layer, the k strip electrodes are connected to form a coil, k>1, and k is a natural number, and the method includes:

when the display device is in a display mode, applying a first electrical signal to the power supply electrode of the grating assembly, and applying a second electrical signal to each of the k strip electrodes of the grating assembly so that liquid crystals between the power supply electrode and each of the strip electrodes deflect to form a grating structure; and when the display device is in a communication mode, applying a third electrical signal to at least two of the k strip electrodes of the grating assembly so that the coil formed by the k strip electrodes generates a magnetic field.

Optionally, the display device further includes a display assembly electrically connected to the control assembly, and the method further includes:

when the display device is in the display mode, controlling the display assembly to display an image, and modulating, by the grating structure, the image displayed by the display assembly to obtain a three-dimensional image.

According to the fourth aspect, a display device is provided, including:

a processing assembly;

a memory for storing executable instructions of the processing assembly; and a grating assembly of claim 1;

wherein the processing assembly is configured to:

when the display device is in a display mode, apply a first electrical signal to the power supply electrode of the grating assembly, and apply a second electrical signal to each of the k strip electrodes of the grating assembly so that liquid crystals between the power supply electrode and each of the strip electrodes deflect to form a grating structure; and when the display device is in a communication mode, apply a third electrical signal to at least two of the k strip electrodes of the grating assembly so that a coil formed by the k strip electrodes generates a magnetic field.

According to a fifth aspect, a readable storage medium storing instructions is provided, wherein when the readable storage medium runs on a control assembly, the control assembly executes a control method for a display device, the method including:

when the display device is in a display mode, applying a first electrical signal to the power supply electrode of the grating assembly, and applying a second electrical signal to each of the k strip electrodes of the grating assembly so that liquid crystals between the power supply electrode and each of the strip electrodes deflect to form a grating structure; and when the display device is in a communication mode, applying a third electrical signal to at least two of the k strip electrodes of the grating assembly so that a coil formed by the k strip electrodes generates a magnetic field.

It is to be understood that both the foregoing general description and the following detailed description are exemplary and explanatory only and are not restrictive of the present application.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

The drawings herein are incorporated in and constitute a part of this specification of the present application, showing embodiments consistent with the present application, and explaining the principles of the present application together with the description.

DETAILED DESCRIPTION

The present application will be described in further detail with reference to the enclosed drawings, to clearly present the objects, technical solutions, and advantages of the present application. Apparently, the embodiments described in the following exemplary embodiments are not representative of all embodiments consistent with the present application. Based on the embodiments in the present application, all other embodiments derived by a person of ordinary skill in the art without any creative efforts shall fall within the scope of protection of the present application.

An NFC antenna is a necessary structure for implementing an NFC function. The NFC antenna in the related art is mainly provided on a terminal in the form of an external expansion. This process is more difficult and costly. The NFC antenna can only be used for non-contact communication, which has a low level of integration and is difficult to be applied to miniaturized terminals. The embodiment of the present application relies on a grating assembly to simulate a coil of the NFC antenna, so as to realize the NFC function without providing the NFC antenna in the form of an external expansion, as well as less difficulty and lower cost. The embodiment of the present application integrates the NFC antenna on the grating assembly, which has a high degree of integration and can be applied to miniaturized terminals. In practical applications, the grating assembly is disposed on the outer side of a display panel, so that relying on the grating assembly to simulate the NFC antenna can facilitate a NFC pairing connection between terminals. For the structures and principles of the grating assembly and the display device provided in the embodiments of the present application, reference can be made to the following embodiments.

Figure 1:
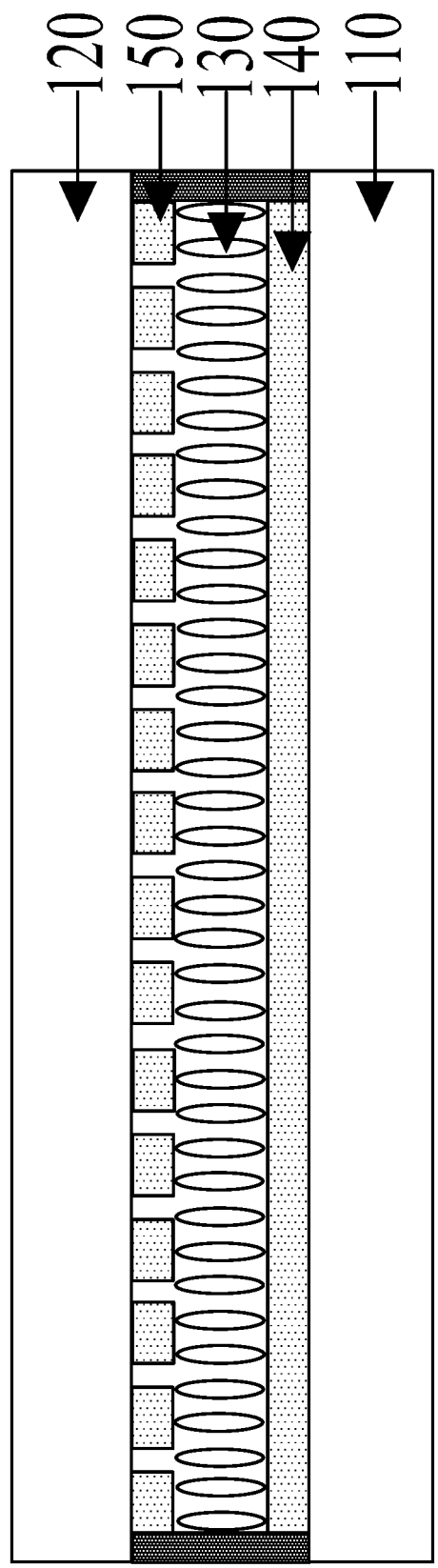
FIG. 1 is a structural schematic diagram of a grating assembly provided in an embodiment of the present application.

Referring to FIG. 1, it shows a structural schematic diagram of a grating assembly 10 provided in an embodiment of the present application. Referring to FIG. 1, the grating assembly 10 comprises: a first substrate 110 and a second substrate 120 disposed opposite to each other, and a liquid crystal layer 130 disposed between the first substrate 110 and the second substrate 120. The first substrate 110 is provided with a power supply electrode 140 on a side adjacent to the liquid crystal layer 130, and the second substrate 120 is provided with k strip electrodes 150 on a side adjacent to the liquid crystal layer 130. The k strip electrodes 150 are connected to form a coil, k>1, and k is a natural number.

The power supply electrode 140 is configured to receive a first electrical signal. Each of the k strip electrodes 150 is configured to receive a second electrical signal. The liquid crystal between the power supply electrode 140 and each of the strip electrodes 150 is configured to deflect to form a grating structure, after the power supply electrode 140 receives the first electrical signal and each of the strip electrodes 150 receives the second electrical signal (not shown in FIG. 1). At least two of the k strip electrodes 150 are further configured to receive a third electrical signal so that the coil formed by the k strip electrodes 150 generates a magnetic field.

In summary, in the grating assembly provided in the embodiment of the present application, since k strip electrodes are connected to form a coil, the coil can simulate a coil of an NFC antenna, so that the NFC antenna does not need to be set up in an external expansion manner. The problem of the relatively high cost of setting up the NFC antenna in the related art is solved, which helps to reduce the cost.

In some embodiments, in FIG. 1, the power supply electrode 140 being a plate electrode is taken as an example. For practical applications, the power supply electrode 140 may also include a plurality of strip electrodes that correspond to the k strip electrodes 150 in a one-to-one manner, which is not limited in the embodiments of the present application.

Referring to FIG. 2 to FIG. 7, a schematic structural diagram of the k strip electrodes 150 provided in the embodiment of the present application being connected to form a coil is shown. Referring to FIGS. 2 to 7, the length directions y of the k strip electrodes 150 are parallel. The k strip electrodes 150 are arrayed in a first direction x. The first direction x intersects with the length direction y of each of the k strip electrodes 150. Exemplarily, the first direction x vertically intersects with the length direction y of each of the k strip electrodes 150. It should be noted that, referring to FIG. 2 to FIG. 7, the power supply electrode 140 and the strip electrode 150 are also connected to a control circuit to receive an electrical signal applied by the control circuit. In the embodiment of the present application, the control circuit may be a control circuit of the grating assembly 10 and may also be other devices (for example, a control circuit of a display panel), which is not limited in this embodiment of the present application.

In some embodiments, in a first implementation in which the k strip electrodes 150 are connected to form a coil, the grating assembly 10 comprises m strip electrode groups arrayed in the first direction x. Each of the m strip electrode groups comprises at least one of the k strip electrodes 150, and at least one of the m strip electrode groups is formed by a parallel connection of at least two of the k strip electrodes 150. The i-th strip electrode group and the (m+1−i)-th strip electrode group of the m strip electrode groups are different. The first end of the i-th strip electrode group is connected to the first end of the (m+1−i)-th strip electrode group, and the second end of the i-th strip electrode group and the second end of the (m+1−i)-th strip electrode group are configured to receive electrical signals. The electrical signal includes the third electrical signal, m>1, 0<i≤m/2, and both m and i are natural numbers.

In the embodiment of the present application, the i-th strip electrode group is connected to the (m+1−i)-th strip electrode group to form a loopback coil. The m strip electrode groups form a plurality of loopback coils. The number of strip electrodes 150 in each strip electrode group can be flexibly set. Among the m strip electrode groups, the number of strip electrodes 150 in any two strip electrode groups can be equal or not. For example, a part of strip electrode groups in the m strip electrode groups includes one strip electrode, another part of strip electrode groups includes two strip electrodes, and a further part of strip electrode groups includes three strip electrodes, and so on, which is not limited in the present application. It should be noted that in practical applications, a first end of the i-th strip electrode group in the m strip electrode groups is connected to a first end of the (m+1−i)-th strip electrode group. A second end of the i-th strip electrode group and a second end of the (m+1−i)-th strip electrode group are respectively connected to a control circuit so as to form a loopback coil. The second end of the i-th strip electrode group and the second end of the (m+1−i)-th strip electrode group are respectively connected to a control circuit to receive an electrical signal applied by the control circuit. A first end of any, one of the strip electrode groups is one end of the strip electrode group far from the control circuit.

Figure 2:
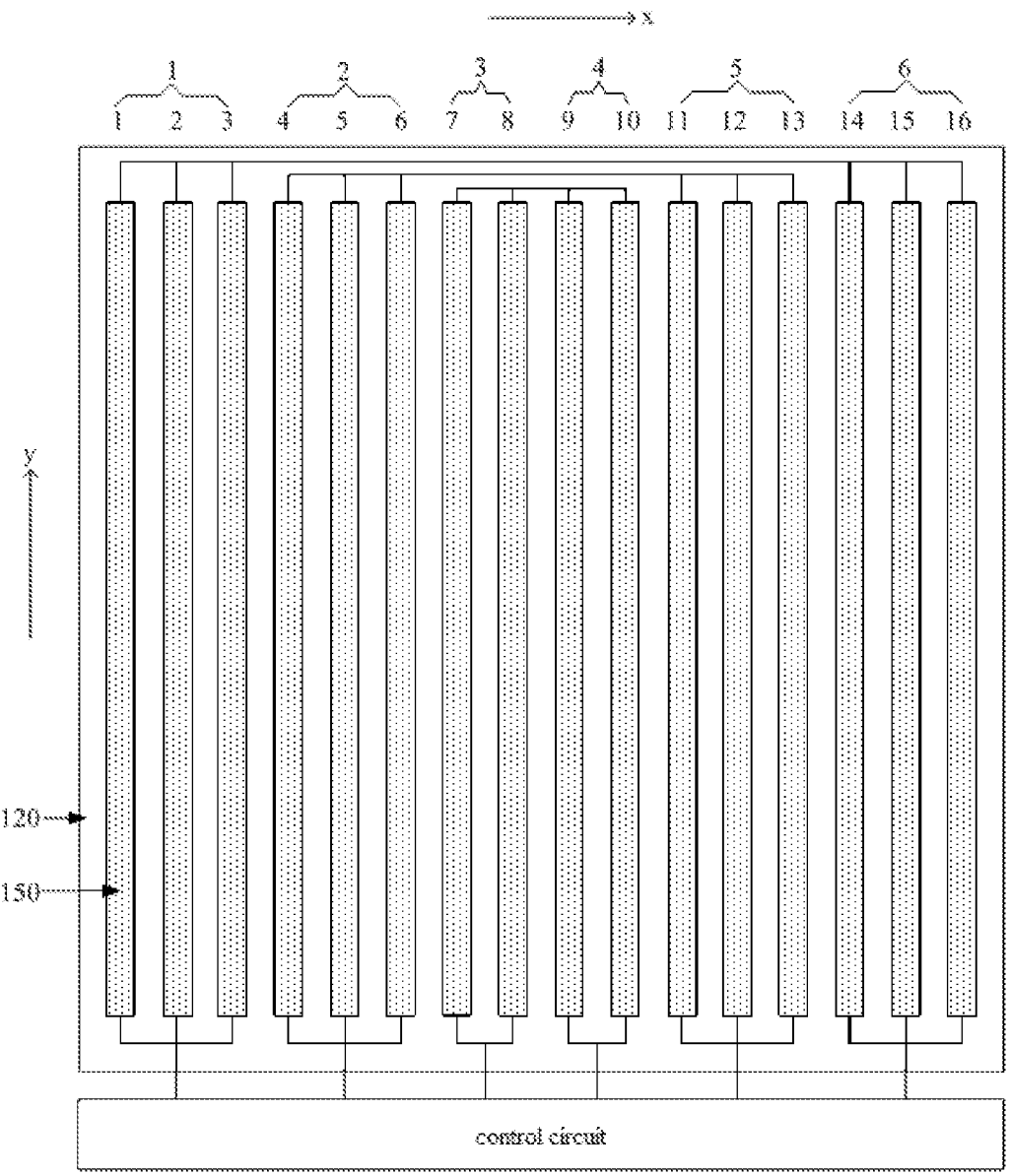
FIG. 2 is a schematic diagram of a coil formed by strip electrodes provided in an embodiment of the present application.

Exemplarily, as shown in FIG. 2, 16 strip electrodes 150 are arranged on the second substrate 120. The 16 strip electrodes 150 are arrayed in the first direction x. The 16 strip electrodes 150 form 6 strip electrode groups arrayed in the first direction x. The number of the 16 strip electrodes 150 may be as shown in FIG. 2. The 6 strip electrode groups include: a strip electrode group 1 formed by a parallel connection of the first to third strip electrodes 150, a strip electrode group 2 formed by a parallel connection of the fourth to sixth strip electrodes 150, and a strip electrode group 3 formed by a parallel connection of the seventh to eighth strip electrodes 150, a strip electrode group 4 formed by a parallel connection of the ninth to tenth strip electrodes 150, a strip electrode group 5 formed by a parallel connection of the 11th to 13th strip electrodes 150, and a strip electrode group 6 formed by a parallel connection of the 14th to 16th strip electrodes 150.

In the 6 strip electrode groups, a first end of the first strip electrode group (strip electrode group 1) is connected to a first end of the sixth strip electrode group (strip electrode group 6). A second end of the first strip electrode group and a second end of the sixth strip electrode group are respectively connected to a control circuit to form a loopback coil. The second end of the first strip electrode group and the second end of the sixth strip electrode group are respectively configured to receive an electrical signal applied by the control circuit. The electrical signal includes the third electrical signal. A first end of the second strip electrode group (strip electrode group 2) is connected to a first end of the fifth strip electrode group (strip electrode group 5). A second end of the second strip electrode group and a second end of the fifth strip electrode group are respectively connected to a control circuit to form a loopback coil. The second end of the second strip electrode group and the second end of the fifth strip electrode group are respectively configured to receive an electrical signal applied by the control circuit. The electrical signal includes the third electrical signal. A first end of the third strip electrode group (strip electrode group 3) is connected to a first end of the fourth strip electrode group (strip electrode group 4). A second end of the third electrode group and a second end of the fourth electrode group are respectively connected to a control circuit to form a loopback coil. The second end of the third electrode group and the second end of the fourth electrode group are respectively configured to receive an electrical signal applied by the control circuit. The electrical signal includes the third electrical signal. As shown in FIG. 2, the 6 strip electrode groups form a total of three loopback coils.

Figure 8:
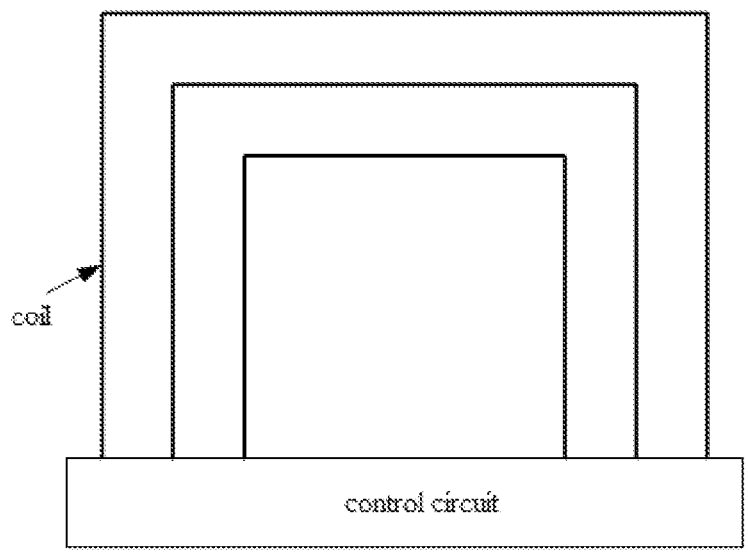
FIG. 8 is an equivalent circuit diagram of the coil formed by strip electrodes shown in FIG. 2.

In the embodiment of the present application, an equivalent circuit diagram of the loopback coil shown in FIG. 2 may be as shown in FIG. 8. Referring to FIGS. 2 and 8, the 16 strip electrodes 150 form three loopback coils. An electrical signal may be applied to the strip electrodes 150 in each loopback coil to generate a magnetic field in the loopback coil. The electrical signal may be a DC signal or an AC signal. The electrical signals applied to the strip electrodes 150 in the same loopback coil may be the same. The electrical signals applied to the strip electrodes 150 in different loopback coils may be the same or different, which is not limited in this embodiment of the present application. It should be noted that FIG. 2 is merely exemplary. In practical applications, there may be a strip electrode group including one strip electrode in the m strip electrode groups, and there may be a strip electrode which does not form loopback coils in the k strip electrodes, which is not limited in this embodiment of the present application.

In some embodiments, in a second implementation in which the k strip electrodes 150 are connected to form a coil, the j-th strip electrode 150 and the (k+1−j)-th strip in the k strip electrodes 150 are different. A first end of the j-th strip electrode 150 is connected to a first end of the (k+1−j)-th strip electrode 150. A second end of the j-th strip electrode 150 and a second end of the (k+1−j)-th strip electrode 150 are respectively configured to receive an electrical signal. The electrical signal includes the third electrical signal, 0<j≤k/2, and j is a natural number. In the embodiment of the present application, the j-th strip electrode 150 and the (k+1−j)-th strip electrode 150 are connected to form a loopback coil. The k strip electrodes 150 form a plurality of loopback coils. It should be noted that in practical applications, the first end of the j-th strip electrode 150 in the k strip electrodes 150 is connected to the first end of the (k+1−j)-th strip electrode 150. The second end of the j-th strip electrode 150 and the second end of the (k+1−j)-th strip electrode group are respectively connected to a control circuit to form a loopback coil. The second end of the j-th strip electrode 150 and the second end of the (k+1−j)-th strip electrode group are respectively connected to the control circuit to receive an electrical signal applied by the control circuit. A first end of any one of the strip electrodes is one end of the strip electrode far from the control circuit.

Figure 3:
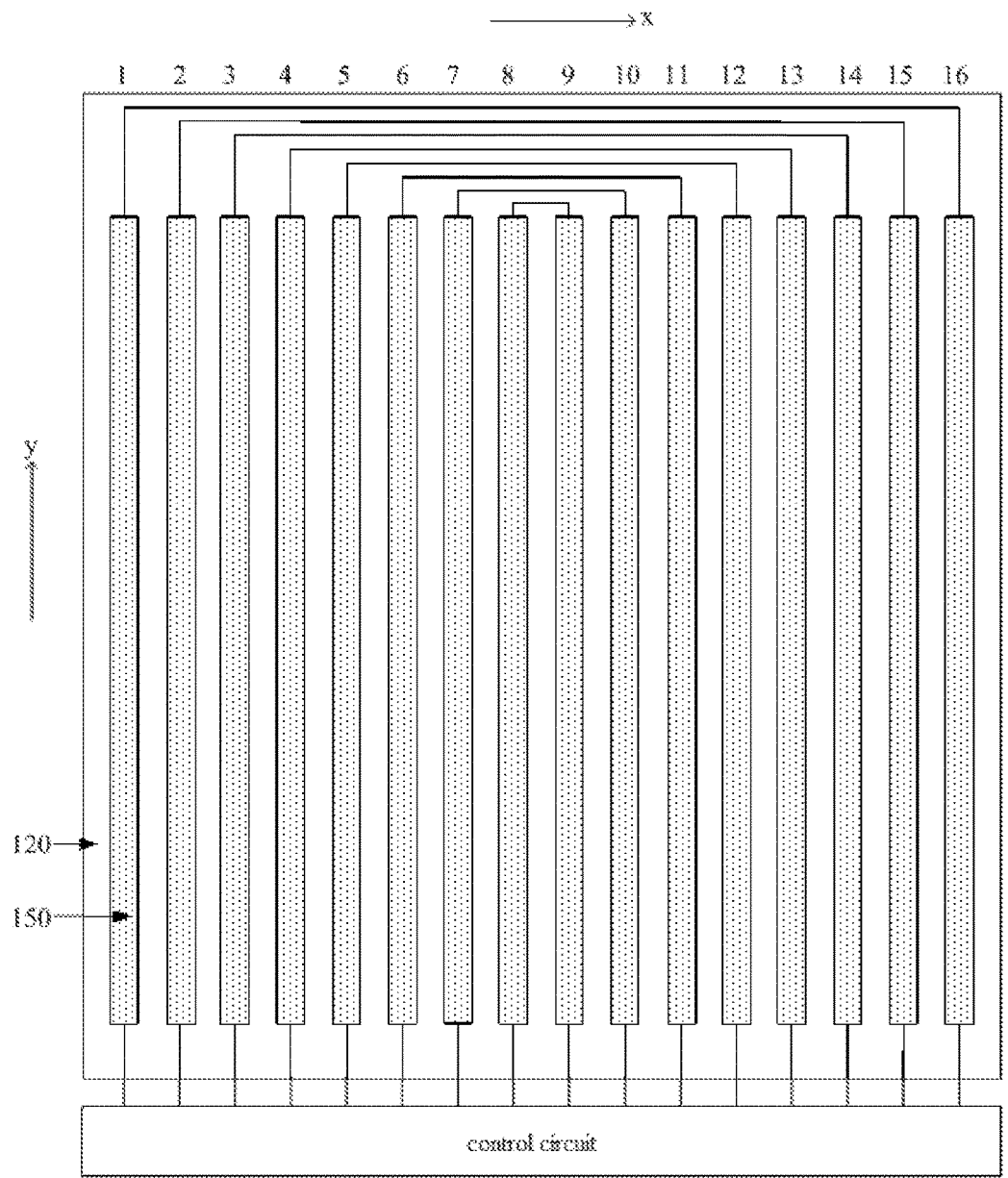
FIG. 3 is a schematic diagram of another coil formed by strip electrodes provided in an embodiment of the present application.

Exemplarily, as shown in FIG. 3, 16 strip electrodes 150 are arranged on the second substrate 120. The 16 strip electrodes 150 are arrayed in the first direction x. The number of the 16 strip electrodes 150 can be as shown in FIG. 3. Among the 16 strip electrodes 150, a first end of the first strip electrode 150 is connected to a first end of the 16th strip electrode 150. The second end of the first strip electrode 150 and the second end of the 16th strip electrode 150 are respectively connected to a control circuit to form a loopback coil. The second end of the first strip electrode 150 and the second end of the 16th strip electrode 150 are respectively configured to receive an electrical signal applied by the control circuit. The electrical signal includes the third electrical signal. A first end of the second strip electrode 150 is connected to a first end of the 15th strip electrode 150. A second end of the second strip electrode 150 and a second end of the 15th strip electrode 150 are respectively connected to a control circuit to form a loopback coil. The second end of the second strip electrode 150 and the second end of the 15th strip 150 are respectively, configured to receive an electrical signal applied by the control circuit. The electrical signal includes the third electrical signal. A first end of the third strip electrode 150 is connected to a first end of the 14th strip electrode 150. A second end of the third strip electrode 150 and a second end of the 14th strip electrode 150 are respectively connected to the control circuit to form a loopback coil. The second end of the third strip electrode 150 and the second end of the 14th strip electrode 150 are respectively configured to receive an electrical signal applied by the control circuit. The electrical signal includes the third electrical signal, and so on. As shown in FIG. 3, the 16 strip electrodes form a total of 8 loopback coils.

Figure 9:
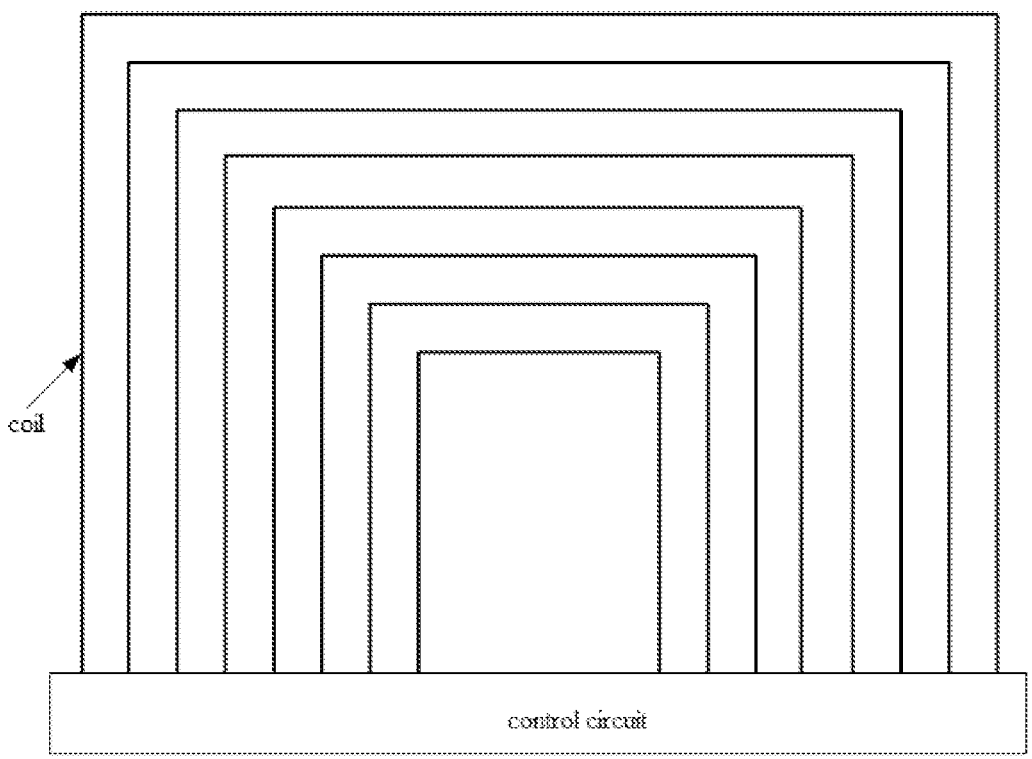
FIG. 9 is an equivalent circuit diagram of the coil formed by strip electrodes shown in FIG. 3.

In the embodiment of the present application, an equivalent circuit diagram of the loopback coil shown in FIG. 3 may be as shown in FIG. 9. Referring to FIGS. 3 and 9, the 16 strip electrodes 150 form eight loopback coils. An electrical signal may be applied to the strip electrodes 150 in each loopback coil to generate a magnetic field in the loopback coil. The electrical signal may be a DC signal or an AC signal. The electrical signals applied to the strip electrodes 150 in the same loopback coil may be the same. The electrical signals applied to the strip electrodes 150 in different loopback coils may be the same or different, which is not limited in this embodiment of the present application.

In some embodiment, in a third implementation in which the k strip electrodes 150 are connected to form a coil, the grating assembly 10 includes g strip electrode groups arrayed in the first direction x. Each of the g strip electrode groups includes at least one of the strip electrodes 150, and at least one of the strip electrode groups is formed by a parallel connection of at least two of the strip electrodes 150. The first end of the w-th strip electrode group in the g strip electrode groups is connected to the first end of the (w+1)-th strip electrode group, and the second end of the (w+1)-th strip electrode group is connected to the second end of the (w+2)-th strip electrode group. The second end of the first strip electrode group and the second end of the g-th strip electrode group in the g strip electrode groups are configured to receive electrical signals. The electrical signal includes the third electrical signal, g>1, 0<w≤g−2, and both g and w are natural numbers.

In the embodiment of the present application, a first end of the w-th strip electrode group is connected to a first end of the (w+1)-th strip electrode group. A second end of the (w+1)-th strip electrode group is connected to a second end of the (w+2)-th strip electrode group to form a serpentine coil. The number of strip electrodes 150 in each strip electrode group can be flexibly set. The number of strip electrodes 150 in any two strip electrode groups of the g strip electrode groups can be equal or not. For example, a part of strip electrode groups in the g strip electrode groups includes one strip electrode, another part of strip electrode groups includes two strip electrodes, and a further part of strip electrode groups includes three strip electrodes, and so on, which is not limited in the present application. It should be noted that, in practical applications, a second end of the first strip electrode group and a second end of the g-th strip electrode group in the g strip electrode groups are respectively connected to a control circuit to form a serpentine coil. The second end of the first strip electrode group and the second end of the g-th strip electrode group are respectively connected to a control circuit to receive an electrical signal applied by the control circuit. A first end of any strip electrode group is one end of the strip electrode far from the control circuit.

Figure 4:
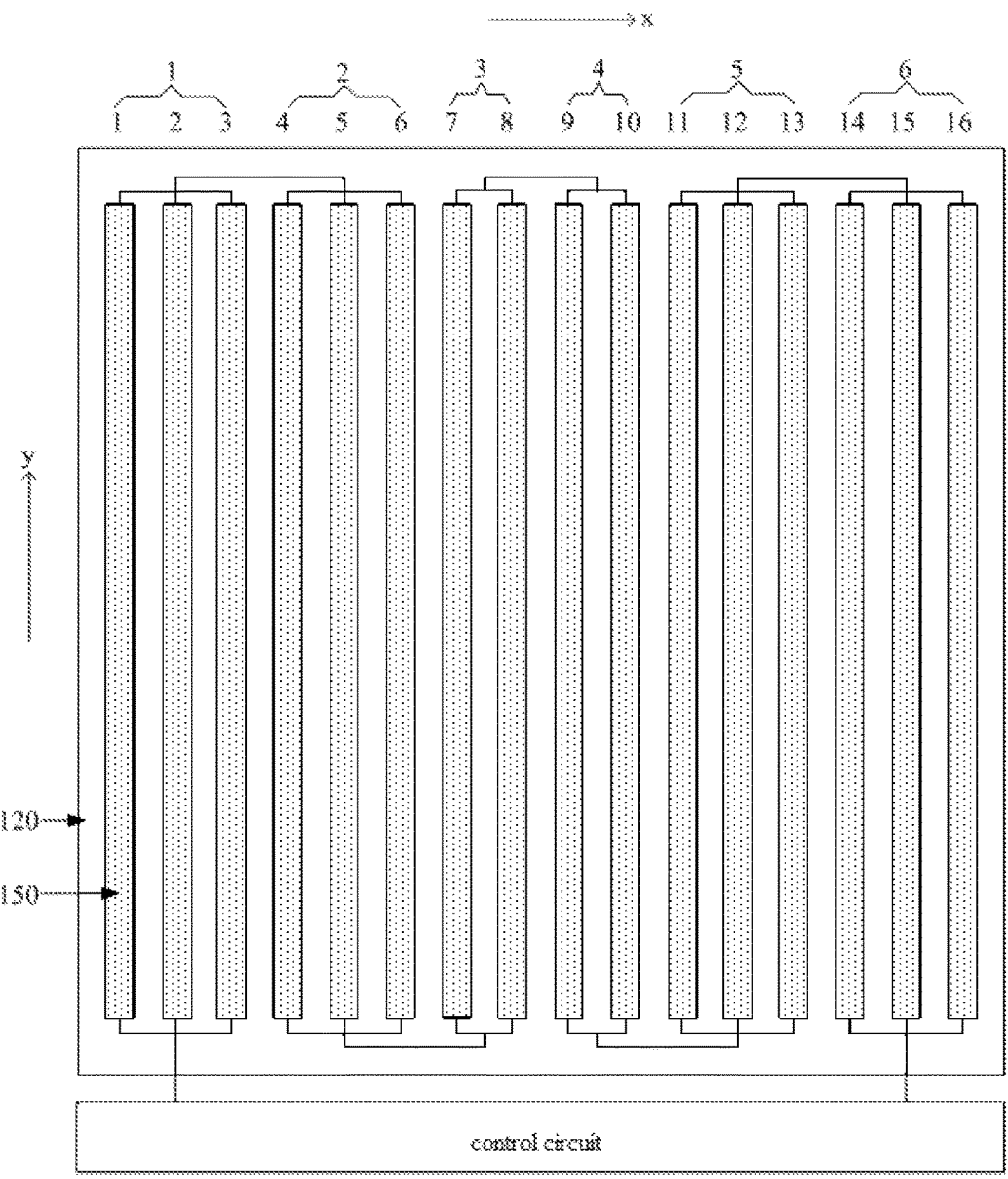
FIG. 4 is a schematic diagram of yet another coil formed by strip electrodes provided in an embodiment of the present application.

Exemplarily, as shown in FIG. 4, 16 strip electrodes 150 are arranged on the second substrate 120. The 16 strip electrodes 150 are arrayed in the first direction x. The 16 strip electrodes 150 form 6 strip electrode groups arrayed in the first direction x. The number of the 16 strip electrodes 150 is as shown in FIG. 4. The 16 strip electrode groups include: a strip electrode group 1 formed by a parallel connection of the first to third strip electrodes 150, a strip electrode group 2 formed by a parallel connection of the fourth to sixth strip electrodes 150, and a strip electrode group 3 formed by a parallel connection of the seventh to eighth strip electrodes 150, a strip electrode group 4 formed by a parallel connection of the ninth to tenth strip electrodes 150, a strip electrode group 5 formed by a parallel connection of the 11th to 13th strip electrodes 150, and a strip electrode group 6 formed by a parallel connection of the 14th to the 16th strip electrodes 150. In the 6 strip electrode groups, a first end of the first strip electrode group (strip electrode group 1) is connected to a first end of the second strip electrode group (strip electrode group 2). A second end of the second strip electrode group is connected to a second end of the third strip electrode group (strip electrode group 3). A first end of the third strip electrode group is connected to a first end of the fourth strip electrode group (strip electrode group 4). A second end of the fourth strip electrode group is connected to a second end of the fifth strip electrode group (strip electrode group 5). A first end of the fifth strip electrode group is connected to a first end of the sixth strip electrode group (strip electrode group 6). A second end of the first strip electrode group and a second end of the sixth strip electrode group are respectively connected to a control circuit to receive an electrical signal applied by the control circuit. The electrical signal includes the third electrical signal.

Figure 10:
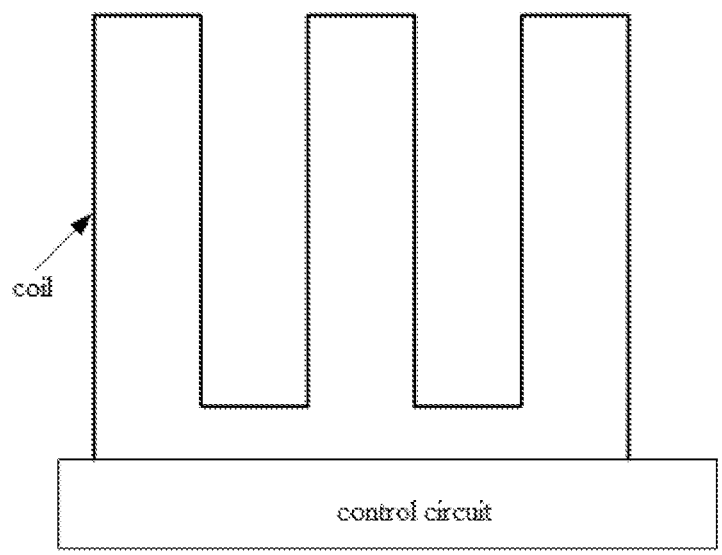
FIG. 10 is an equivalent circuit diagram of the coil formed by strip electrodes shown in FIG. 4.

In the embodiment of the present application, an equivalent circuit diagram of the serpentine coil shown in FIG. 4 may be as shown in FIG. 10. Referring to FIG. 4 and FIG. 10, the 16 strip electrodes 150 form a serpentine coil. An electrical signal may be applied to each strip electrode 150 in the serpentine coil to generate a magnetic field in the serpentine coil. The electrical signal may be a DC signal or an AC signal, which is not limited in this embodiment of the present application. It should be noted that FIG. 4 is merely exemplary. In practical applications, there may be a strip electrode group including one strip electrode in the g strip electrode groups, and there may be a strip electrode that does not form a serpentine coil in the k strip electrode, which is not limited in this embodiment of the present application.

Figure 5:
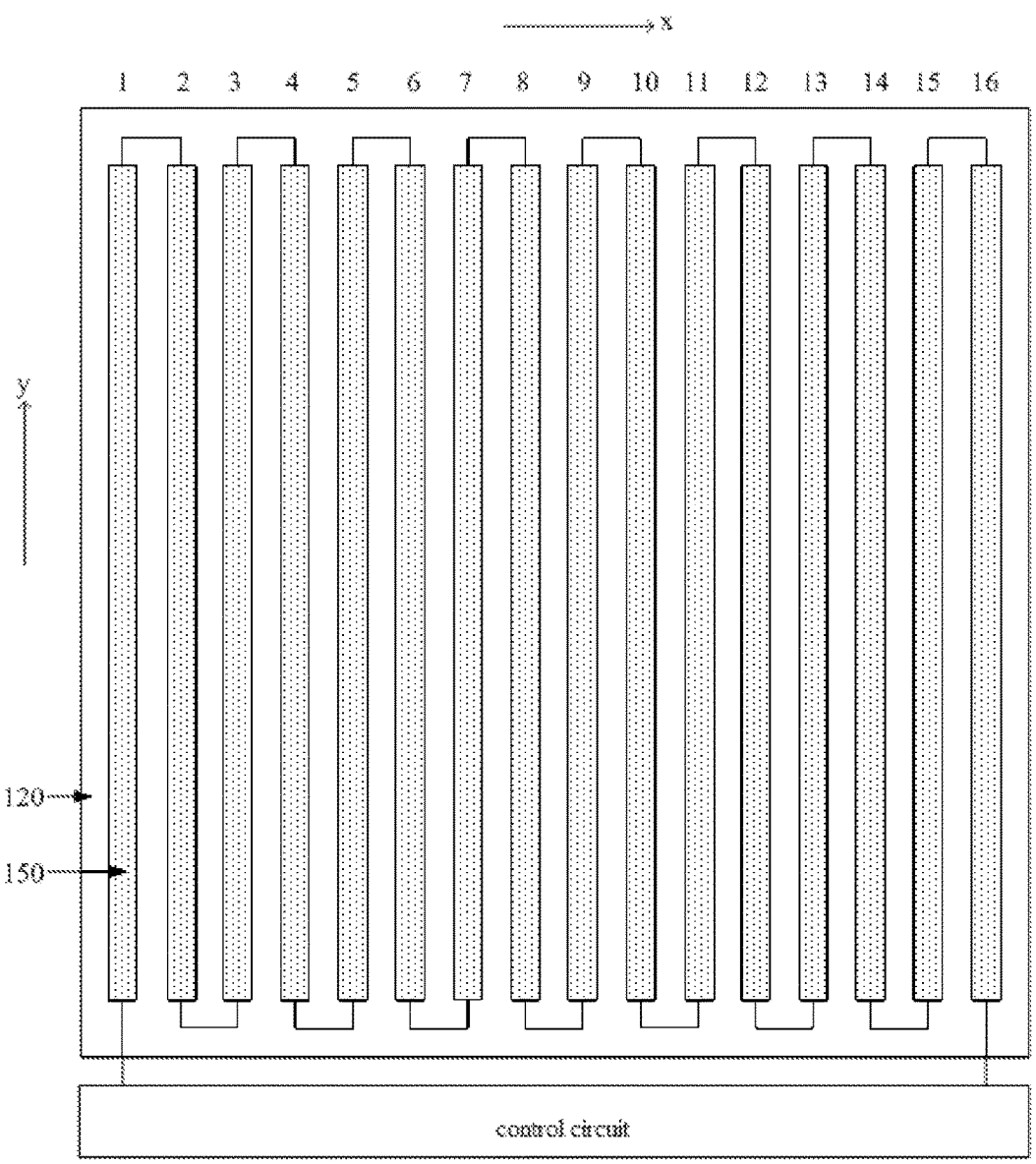
FIG. 5 is a schematic diagram of still yet another coil formed by strip electrodes provided in an embodiment of the present application.

In some embodiments, in a fourth implementation in which the k strip electrodes 150 are connected to form a coil, a first end of the u-th strip electrode 150 in the k strip electrodes 150 is connected to a first end of the (u+1)-th strip electrode 150. A second end of the (u+1)-th strip electrode 150 is connected to a second end of the (u+2)-th strip electrode 150. A second end of the first strip electrode 150 in the k strip electrodes 150 and a second end of the k-th strip electrode 150 are respectively, configured to receive an electrical signal. The electrical signal includes the third electrical signal, $0<u\leq k-2$, and u is a natural number. In the embodiment of the present application, the first end of the u-th strip electrode 150 is connected to the first end of the (u+1)-th strip electrode 150. The second end of the (u+1)-th strip electrode 150 is connected to the second end of the (u+2)-th strip electrode 150 to form a serpentine coil. It should be noted that, in practical applications, a second end of the first strip electrode 150 and a second end of the k-th strip electrode 150 in the k strip electrodes 150 are respectively connected to a control circuit to form a serpentine coil. A second end of the first strip electrode 150 and a second end of the k-th strip electrode 150 are respectively connected to a control circuit to receive an electrical signal applied by the control circuit. A second end of any strip electrode is one end of the strip electrode adjacent to the control circuit. Exemplarily, as shown in FIG. 5, 16 strip electrodes 150 are arranged on the second substrate 120. The 16 strip electrodes 150 are arrayed in the first direction x. The number of the 16 strip electrodes 150 may be as shown in FIG. 5. In the 16 strip electrodes 150, a first end of the first strip electrode 150 is connected to a first end of the second strip electrode 150. A second end of the second strip electrode 150 is connected to a second end of the third strip electrode 150. A first end of the third strip electrode 150 is connected to a first end of the fourth strip electrode 150, and so on. As shown in FIG. 5, the 16 strip electrodes 150 form a serpentine coil. As shown in FIG. 5, a second end of the first strip electrode 150 and a second end of the 16th strip electrode 150 are respectively, connected to a control circuit to receive an electrical signal applied by the control circuit. The electrical signal includes the third electrical signal.

Figure 11:
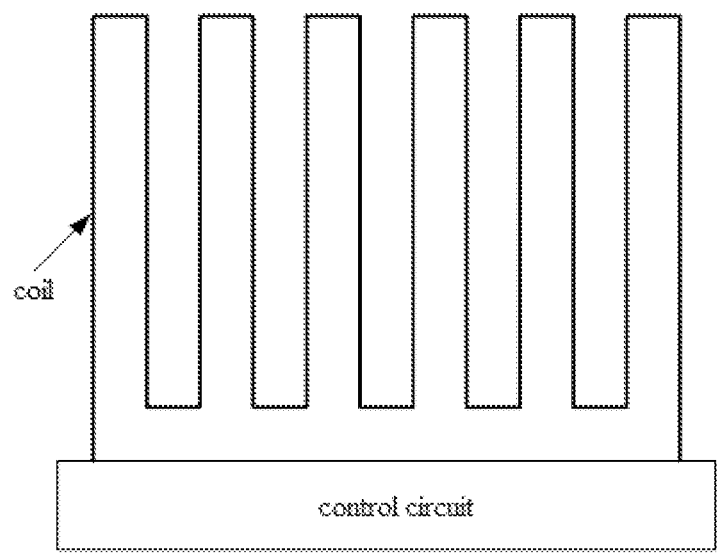
FIG. 11 is an equivalent circuit diagram of the coil formed by strip electrodes shown in FIG. 5.

In the embodiment of the present application, an equivalent circuit diagram of the serpentine coil shown in FIG. 5 may be as shown in FIG. 11. Referring to FIG. 5 and FIG. 11, the 16 strip electrodes 150 form a serpentine coil. An electrical signal may be applied to each strip electrode 150 in the serpentine coil to generate a magnetic field in the serpentine coil. The electrical signal may be a DC signal or an AC signal, which is not limited in this embodiment of the present application.

In some embodiments, in a fifth implementation in which the k strip electrodes 150 are connected to form a coil, the grating assembly 10 includes n strip electrode groups arrayed in the first direction x. Each of the n strip electrode groups includes at least one of the k strip electrodes 150. At least one of the n strip electrode groups is a strip electrode group formed by a parallel connection of at least two of the k strip electrodes 150. The p-th strip electrode group in the n strip electrode groups is different from the (n+1−p)-th strip electrode group. The (n+1−p)-th strip electrode group is different from the (p+1)-th strip electrode group. A first end of the p-th strip electrode group is connected to a first end of the (n+1−p)-th strip electrode group. A second end of the (n+1−p)-th strip electrode group is connected to a second end of the (p+1)-th strip electrode group. One end of the n strip electrode groups that is not connected to the other strip electrode groups is configured to receive an electrical signal. The electrical signal includes the third electrical signal, $n>1$, $0<p<n$, and both n and p are natural numbers. In the embodiment of the present application, the first end of the p-th strip electrode group is connected to the first end of the (n+1−p)-th strip electrode group. The second end of the (n+1−p)-th strip electrode group is connected to the second end of the (p+1)-th strip electrode group to form a spiral coil. The number of strip electrodes 150 in each strip electrode group can be flexibly set. The number of strip electrodes 150 in any two of the n strip electrode groups may be equal or not. For example, a part of strip electrode groups in the n strip electrode groups includes one strip electrode, another part of strip electrode groups includes two strip electrodes, and a further part of strip electrode groups includes three strip electrodes, and so on, which is not limited in the present application. It should be noted that, in practical applications, one end of the n strip electrode groups that is not connected to other strip electrode groups is connected to a control circuit to form a spiral coil. The end that is not connected to the other strip electrode groups is connected to the control circuit to receive an electrical signal applied by the control circuit. A first end of any strip electrode group is one end of the strip electrode group far away from the control circuit.

Figure 6:
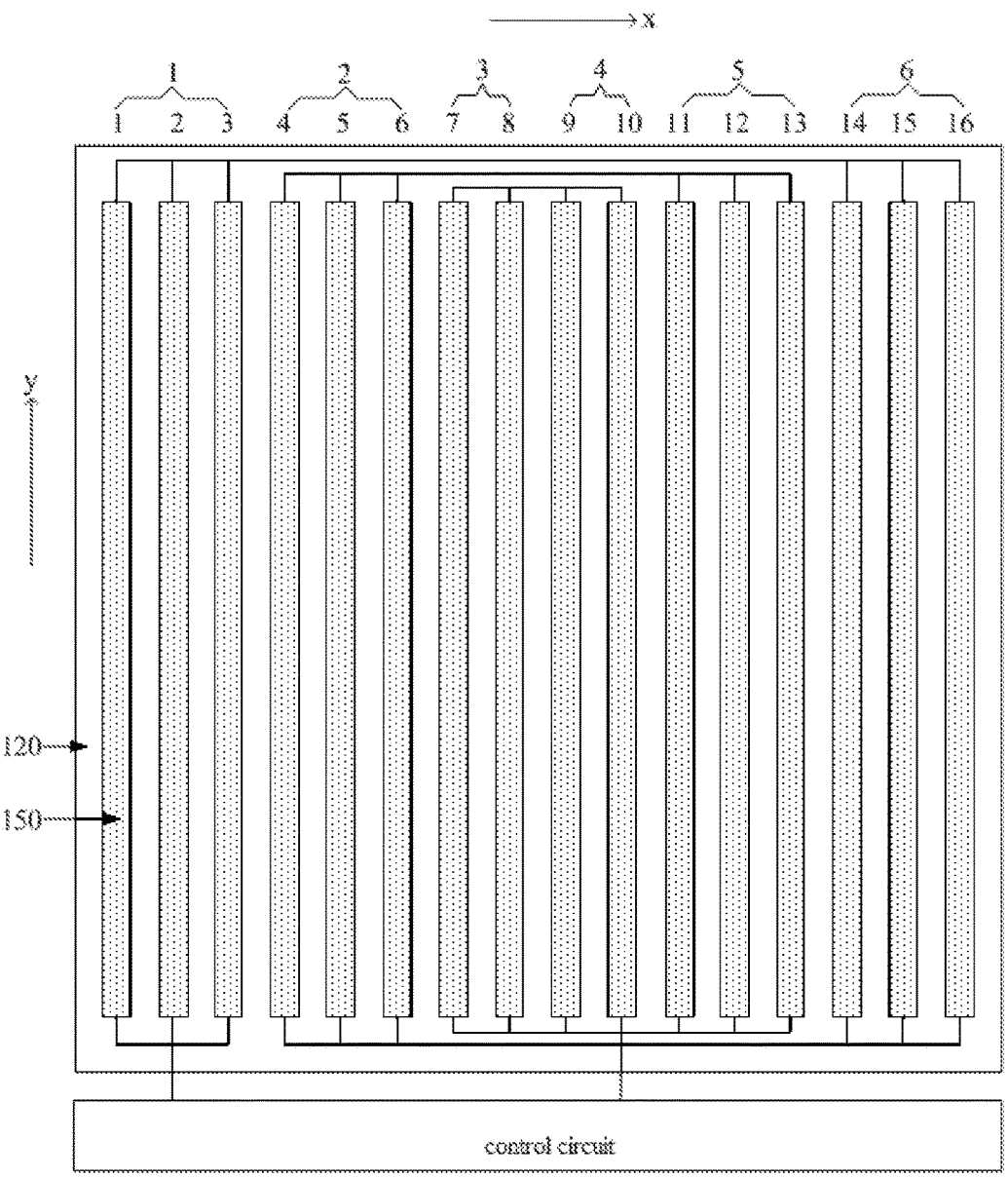
FIG. 6 is a schematic diagram of still yet another coil formed by strip electrodes provided in an embodiment of the present application.

Exemplarily, as shown in FIG. 6, 16 strip electrodes 150 are arranged on the second substrate 120. The 16 strip electrodes 150 are arrayed in the first direction x. The 16 strip electrodes 150 form 6 strip electrode groups that are arrayed in the first direction x. The number of the 16 strip electrodes 150 is as shown in FIG. 6. The 6 strip electrode groups include: a strip electrode group 1 formed by a parallel connection of the first to third strip electrodes 150, a strip electrode group 2 formed by a parallel connection of the fourth to sixth strip electrodes 150, a strip electrode group 3 formed by a parallel connection of the seventh to eighth strip electrodes 150, a strip electrode group 4 formed by a parallel connection of the ninth to tenth strip electrodes 150, a strip electrode group 5 formed by a parallel connection of the 11th to 13th strip electrodes 150, and a strip electrode group 6 formed by a parallel connection of the 14th to the 16th strip electrodes 150. In the 6 strip electrode groups, a first end of the first strip electrode group (strip electrode group 1) is connected to a first end of the sixth strip electrode group (strip electrode group 6). A second end of the sixth strip electrode group is connected to a second end of the second strip electrode group (strip electrode group 2). A first end of the second strip electrode group is connected to a first end of the fifth strip electrode group (strip electrode group 5). A second end of the fifth strip electrode group is connected to a second end of the third strip electrode group (strip electrode group 3). A first end of the third electrode group is connected to a first end of the fourth strip electrode group (strip electrode group 4). A second end of the first strip electrode group and a second end of the fourth strip electrode group are both ends that are not connected to other strip electrodes. The second end of the first strip electrode group and the second end of the fourth strip electrode group are respectively connected to a control circuit to receive an electrical signal applied by the control circuit. The electrical signal includes the third electrical signal.

Figure 12:
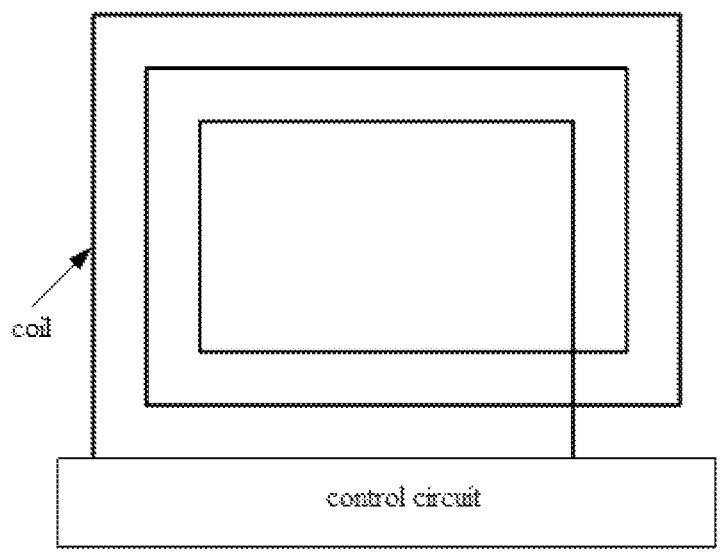
FIG. 12 is an equivalent circuit diagram of the coil formed by strip electrodes shown in FIG. 6.

In the embodiment of the present application, an equivalent circuit diagram of the spiral coil shown in FIG. 6 may be as shown in FIG. 12. Referring to FIG. 6 and FIG. 12, the 16 strip electrodes 150 form a spiral coil. An electrical signal can be applied to each strip electrode 150 in the spiral coil to generate a magnetic field in the spiral coil. The electrical signal may be a DC signal or an AC signal, which is not limited in this embodiment of the present application. It should be noted that FIG. 6 is merely exemplary. In practical applications, there may be a strip electrode group including one strip electrode in n strip electrode groups, and there may also be a strip electrode that does not form a spiral coil in the k strip electrodes, which is not limited in this embodiment of the present application.

In some embodiments, in a sixth implementation in which the k strip electrodes 150 are connected to form a coil, the q-th strip electrode 150 of the k strip electrodes 150 is different from the (k+1−q)-th strip electrode 150, and the (k+1−q)-th strip electrode is different from the (q+1)-th strip electrode. The first end of the q-th strip electrode is connected to the first end of the (k+1−q)-th strip electrode. The second end of the (k+1−q)-th strip electrode is connected to the second end of the (q+1)-th strip electrode. One end of the k strip electrodes that is not connected to one end of the other strip electrode groups is configured to receive an electrical signal. The electrical signal includes the third electrical signal, 0<q<k, and q is a natural number. In the embodiment of the present application, the first end of the q-th strip electrode is connected to the first end of the (k+1−q)-th strip electrode 150, and the second end of the (k+1−q)-th strip electrode is connected to the second end of the (q+1)-th strip electrode 150 to form a spiral coil. It should be noted that in practice, one end of the k strip electrodes that is not connected to one end of other strip electrodes is connected to a control circuit to form a spiral coil. The end that is not connected to one end of other strip electrode is connected to the control circuit to receive an electrical signal applied by the control circuit. The first end of any strip electrode is one end of the strip electrode far away from the control circuit.

Figure 7:
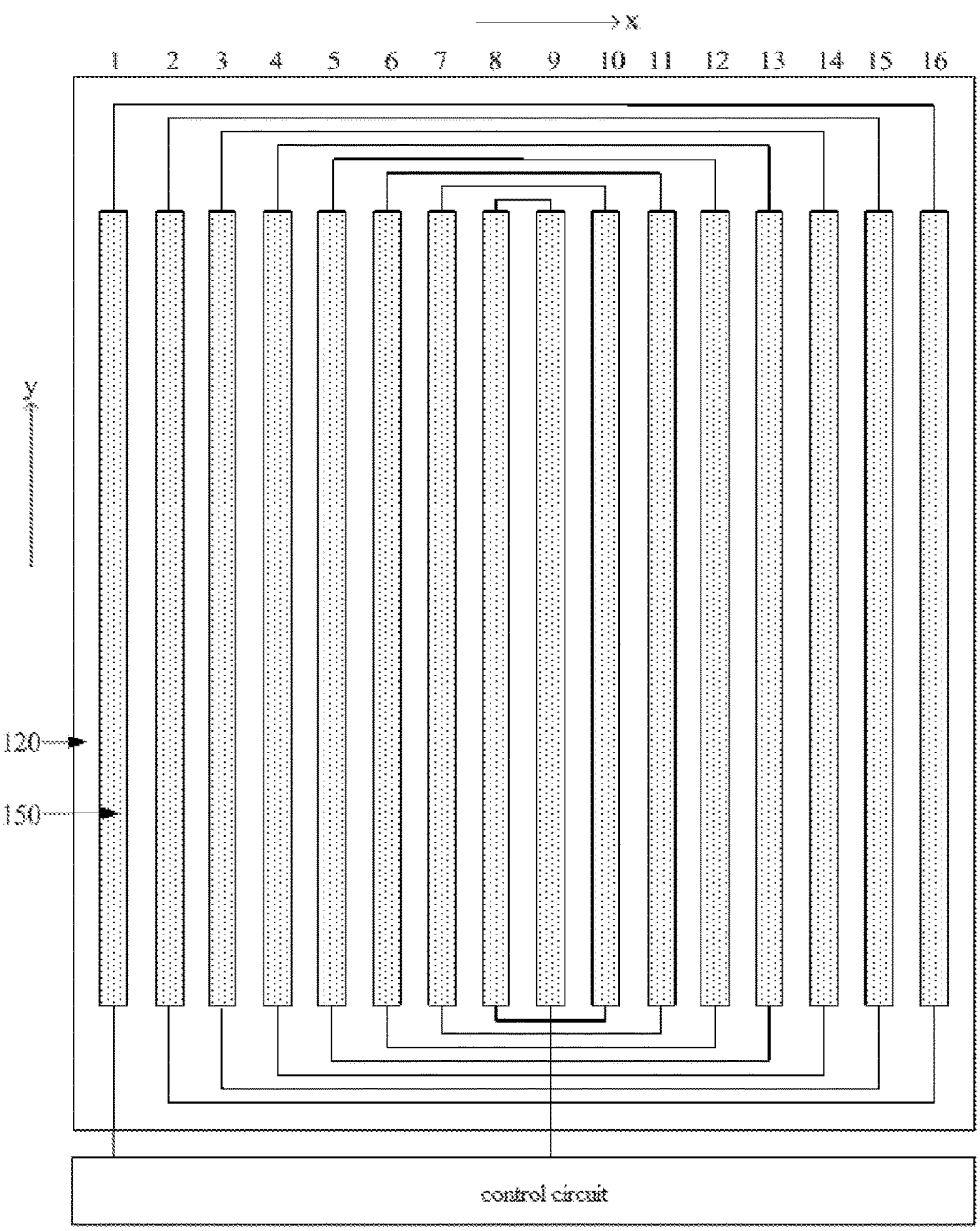
FIG. 7 is a schematic diagram of still yet another coil formed by strip electrodes provided in an embodiment of the present application.

Exemplarily, as shown in FIG. 7, 16 strip electrodes 150 are arranged on the second substrate 120. The 16 strip electrodes 150 are arrayed in the first direction x, and the 16 strip electrodes 150 may be numbered as shown in FIG. 7. In the 16 strip electrodes 150, the first end of the first strip electrode 150 is connected to the first end of the 16th strip electrode 150. The second end of the 16th strip electrode 150 is connected to the second end of the second strip electrode 150. The first end of the second strip electrode 150 is connected to the first end of the 15th strip electrode 150. The second end of the 15th strip electrode 150 is connected to the second end of the third strip electrode 150, and so on, as shown in FIG. 7, the 16 strip electrodes 150 form a spiral coil. As shown in FIG. 7, neither the second end of the first strip electrode 150 nor the second end of the ninth strip electrode 150 is connected to other strip electrode. The second end of the first strip electrode and the second end of the ninth strip electrode are connected to a control circuit to receive an electrical signal applied by the control circuit. The electrical signal includes the third electrical signal.

Figure 13:
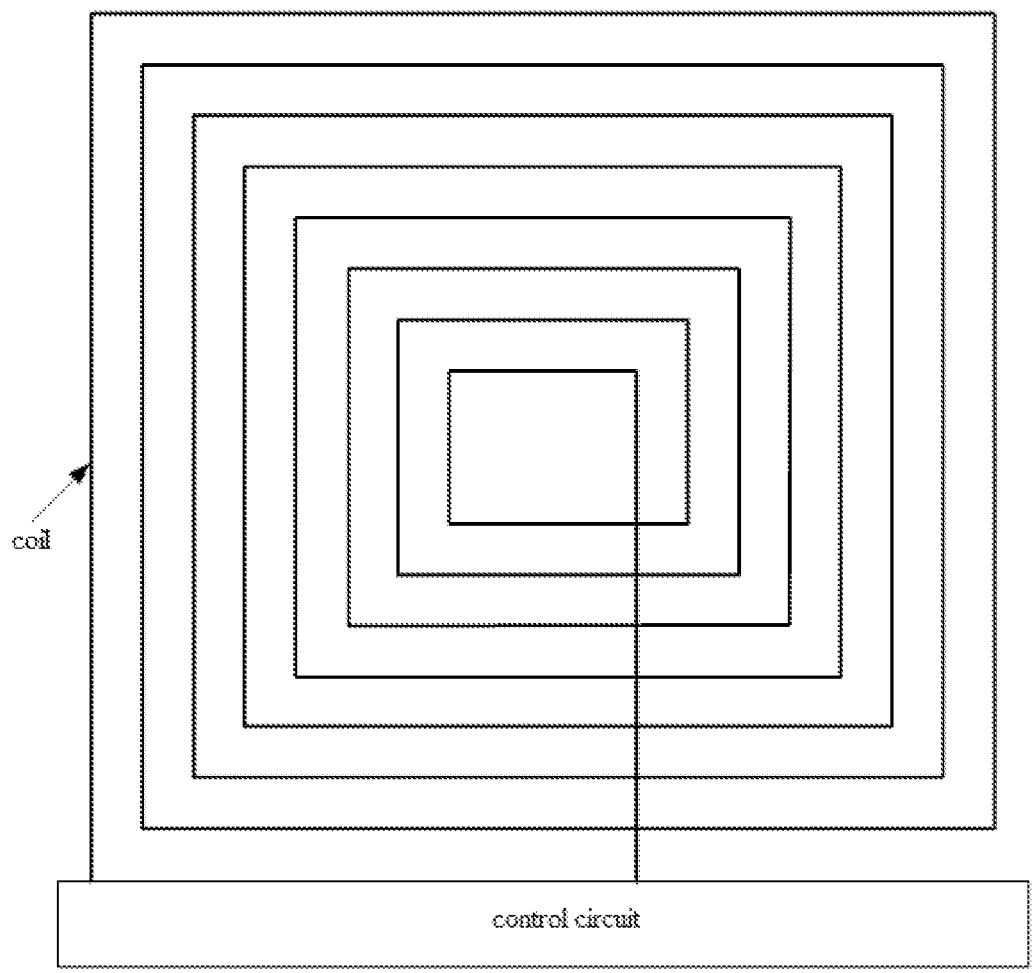
FIG. 13 is an equivalent circuit diagram of the coil formed by strip electrodes shown in FIG. 7.

In the embodiment of the present application, the equivalent circuit diagram of the spiral coil shown in FIG. 7 may be as shown in FIG. 13. Referring to FIG. 7 and FIG. 13, the 16 strip electrodes 150 form a spiral coil. An electrical signal can be applied to each strip electrode 150 in the spiral coil to generate a magnetic field in the spiral coil. The electrical signal may be a DC signal or an AC signal, which is not limited in this embodiment of the present application.

Figure 14:
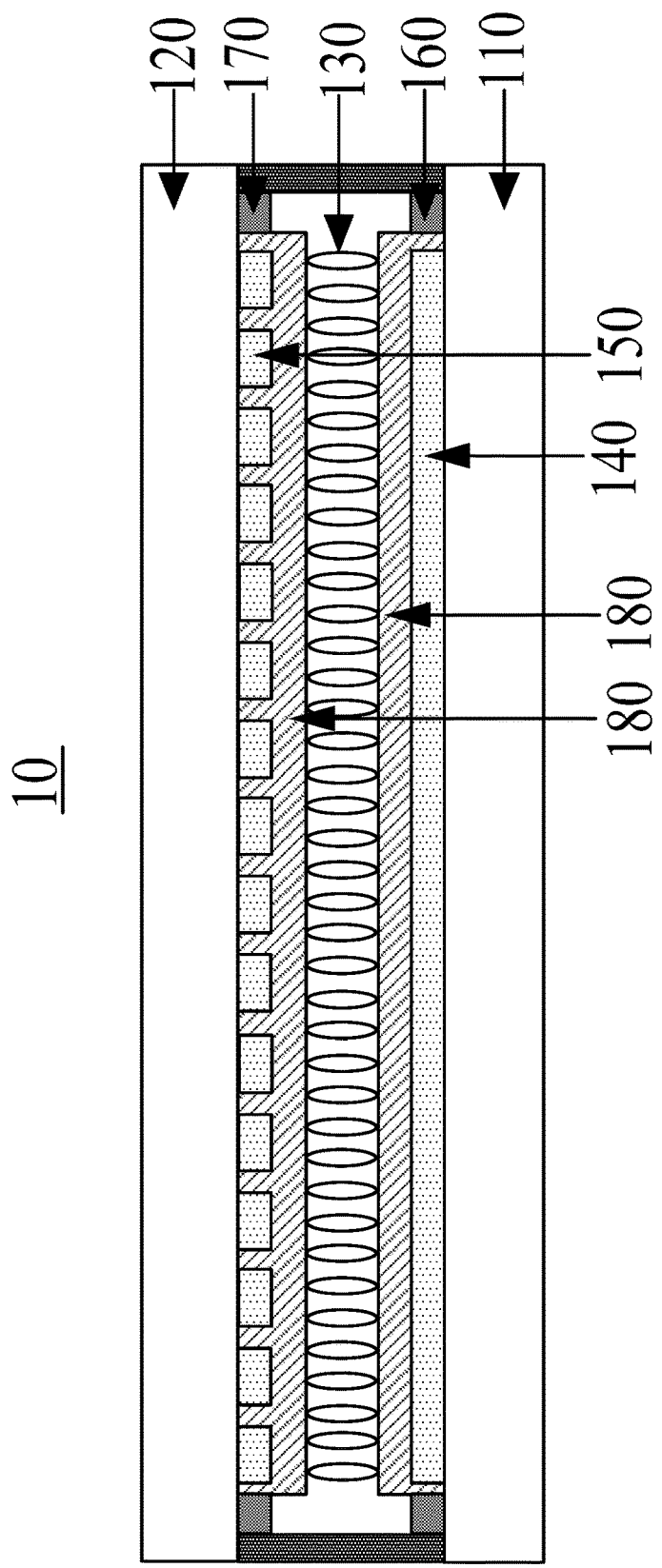
FIG. 14 is a structural schematic diagram of another grating assembly provided in an embodiment of the present application.

In some embodiments, referring to FIG. 14, a schematic structural diagram of another grating assembly 10 provided in the embodiment of the present application is shown. Referring to FIG. 14, a first alignment part 160 is disposed in a peripheral region of the first substrate 110 on a side adjacent to the liquid crystal layer 130. A second alignment part 170 is disposed in a peripheral region of the second substrate 120 on a side adjacent to the liquid crystal layer 130. The first alignment part 160 and the second alignment part 170 are configured to align the first substrate 110 and the second substrate 120. The number of the first alignment part 160 and the number of the second alignment part 170 may be respectively 4. The four first alignment parts 160 may be disposed in the four corners of the first substrate 110. The four second alignment parts 170 may be disposed in the four corners of the second substrate 120. Further, as shown in FIG. 14, a protective layer 180 is provided on the power supply electrode 140 and the k strip electrodes 150, respectively. In some embodiments, an encapsulation frame (not shown in FIG. 14) is further disposed between the first substrate 110 and the second substrate 120. The liquid crystal layer 130 is located between the first substrate 110 and the second substrate 120, and is located within a space enclosed by the encapsulation frame.

It should be noted that in the embodiments of the present application, both the first substrate 110 and the second substrate 120 may be transparent substrates, which may specifically be substrates made of a transmitting and non-metal material with certain sturdiness such as glass, quartz, and transparent resin. The power supply electrode 140 and the strip electrodes 150 can all use semiconductor oxides such as indium tin oxide (ITO), indium zinc oxide (IZO), and the like. The connection lines connecting the k strip electrodes 150 may be formed through the same patterning process as the strip electrode 150. The first alignment part 160 and the second alignment part 170 may be both formed of a metal material. The protective layer 180 may be formed by inorganic insulating materials such as silicon oxide, silicon nitride, or aluminum oxide.

Figure 15:
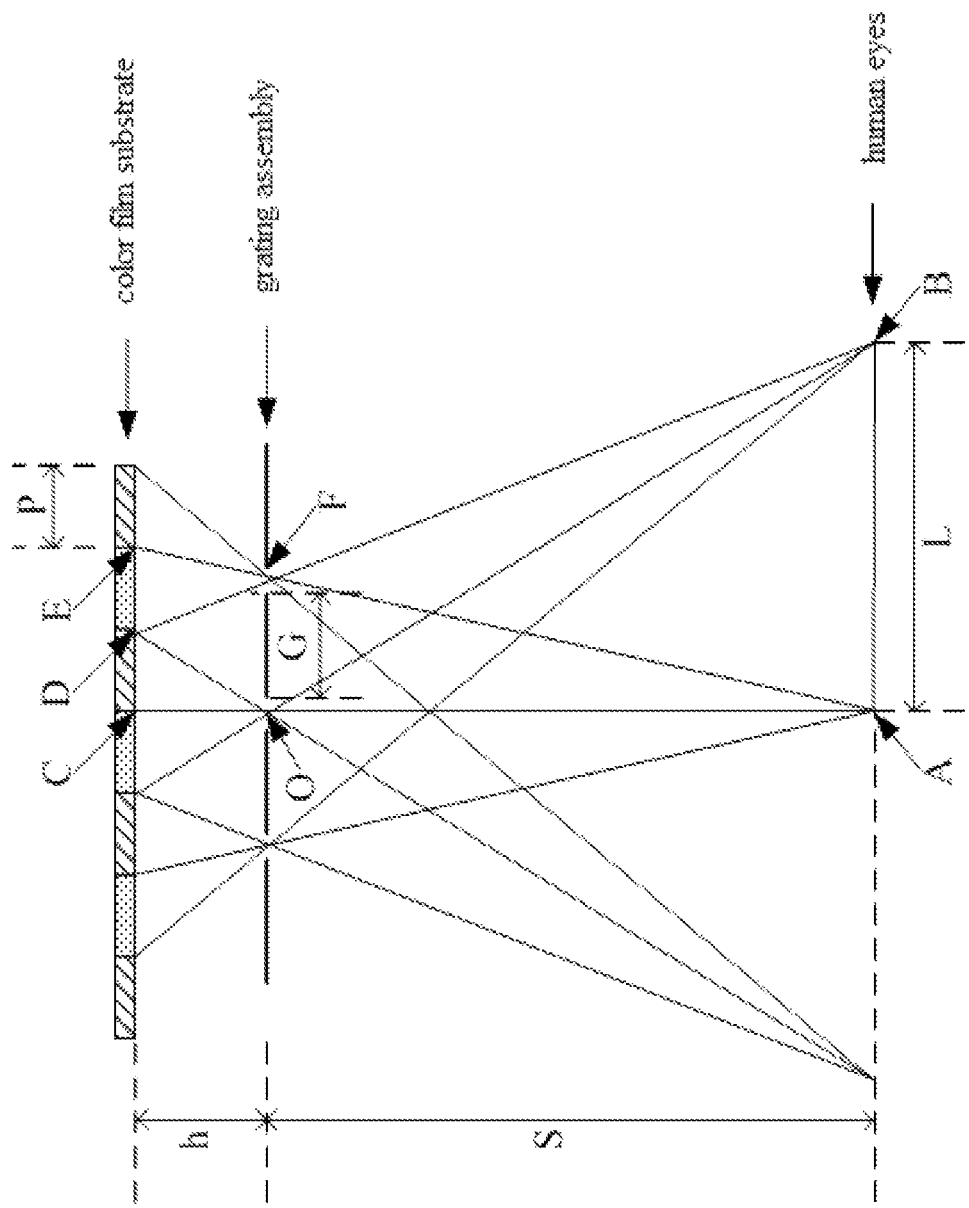
FIG. 15 is a design diagram of a grating assembly provided in an embodiment of the present application.

The grating assembly 10 provided in the embodiments of the present application may be disposed on a side where a light exit surface of the display panel is located, so as to modulate an image displayed on the display panel to obtain a naked eye three-dimensional (3D) image. When a first electrical signal is applied to the power supply electrode 140 of the grating assembly 10 and a second electrical signal is applied to each of the k strip electrodes 150, liquid crystals between the power supply electrode 140 and each of the strip electrodes 150 deflect to form a grating structure. In the embodiment of the present application, in order to ensure the display effect, the distance between any two adjacent grating structures (that is, the distance between any two adjacent strip electrodes 150) needs to meet certain conditions. In the embodiment of the present application, the condition that the distance between any two adjacent strip electrodes 150 meets is described by taking the display panel, which is a liquid crystal display panel, as an example. Referring to FIG. 15, a schematic design diagram of a grating assembly provided in the embodiment of the present application is shown. Referring to FIG. 15, a grating assembly is disposed between a color film substrate of a display panel and a human eye. Each pixel on the display panel (usually, each pixel includes three sub-pixels, i.e., G, B) has a width P. The distance between the grating assembly and the color filter substrate is h. The distance between two pupils of the human eyes is assumed to be L. The distance between the human eyes and the grating assembly is S. The distance between any two adjacent grating structures is G. According to FIG. 15, it can be known that the triangle OCD is similar to the triangle OAB, and the triangle AOF is similar to the triangle ACE. According to the principle of similar triangles, it can be obtained that:

$$\frac{P}{h} = \frac{L}{S}; \text{and} \tag{1}$$

$$\frac{S}{G} = \frac{S+h}{2 \times P} \tag{2}$$

According to formula (1), it can be obtained that, $$h = \frac{S \times P}{L}; \tag{3}$$

Substituting Formula (3) into formula (2), it can be obtained that, $$G = \frac{2 \times P}{1 + \frac{P}{L}}. \tag{4}$$

Generally, the distance L between two pupils of the human eyes is fixed, and L is about 65 mm. Therefore, according to formula (3), the distance h between the grating assembly and the color filter substrate is determined by the width P of the pixel and the distance S between the human eyes and the grating assembly. According to formula (4), the distance G between any two adjacent grating structures is determined by the width P of the pixel. In the embodiment of the present application, when manufacturing the grating assembly 10, the distance between any two adjacent grating structures of the grating assembly 10 may be determined according to the width of the pixels on the display panel. That is, the distance between any two adjacent strip electrodes 150 on the second substrate 120 is determined according to the width of the pixel on the display panel.

Figure 16:
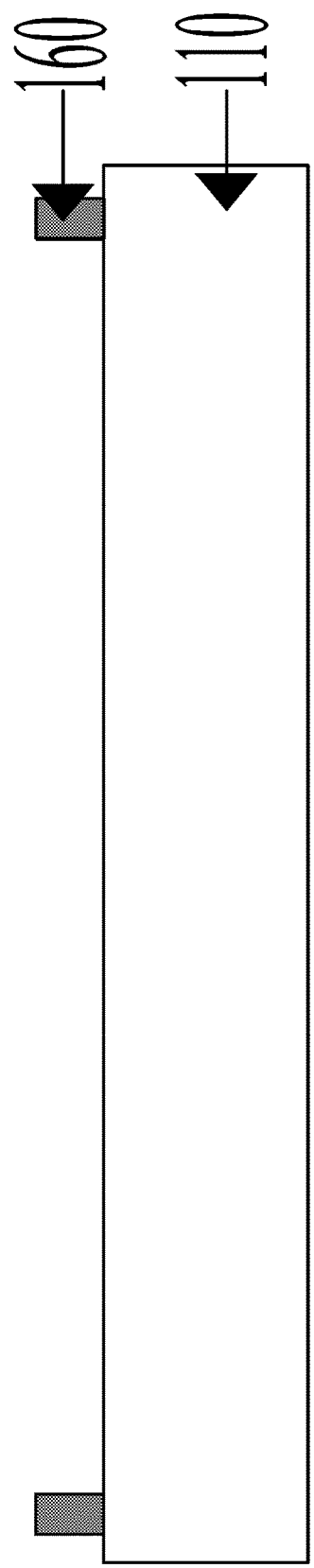
FIG. 16 is a structural schematic diagram of a first substrate after a first alignment part is formed thereon provided in an embodiment of the present application.
Figure 17:
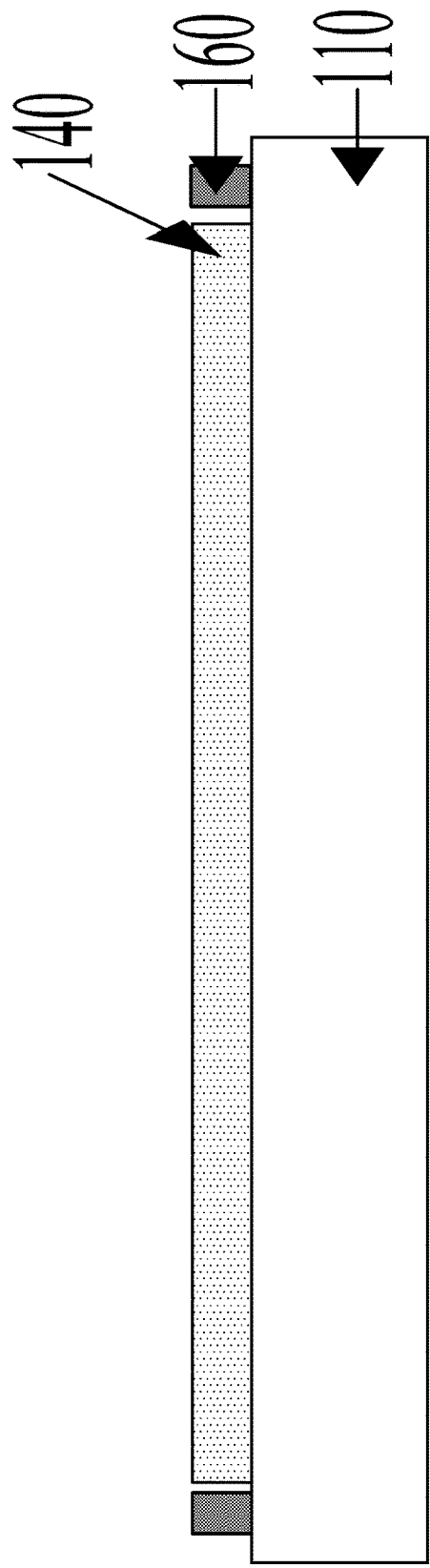
FIG. 17 is a structural schematic diagram of a first substrate with a first alignment part, after a power supply electrode is formed thereon, provided in an embodiment of the present application.
Figure 18:
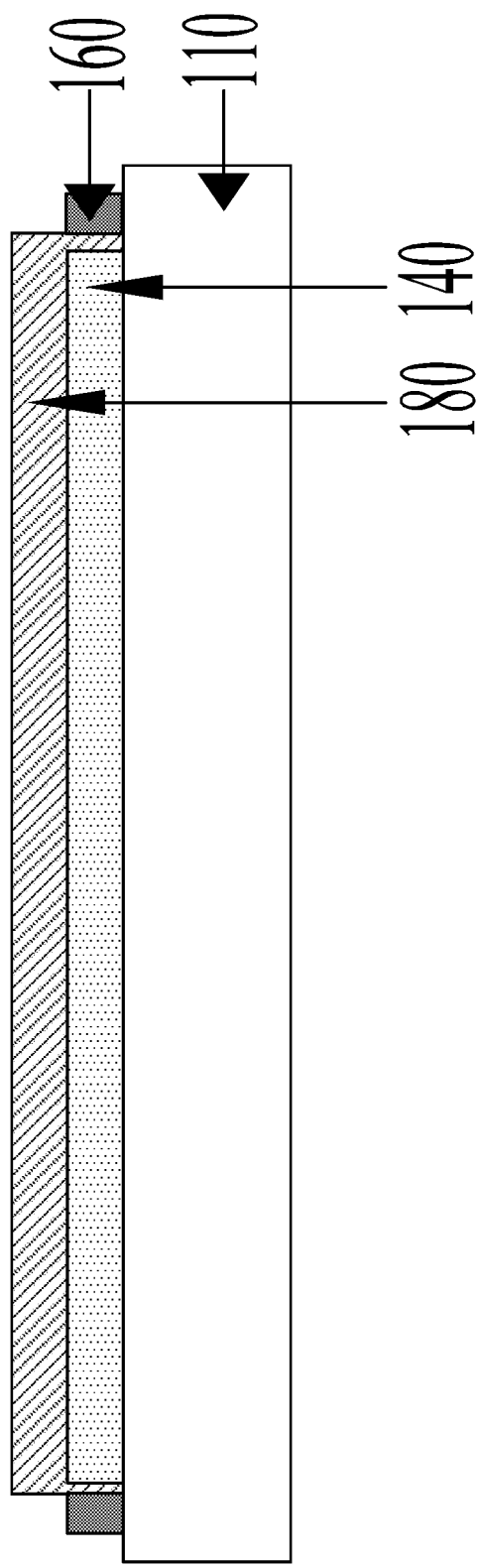
FIG. 18 is a structural schematic diagram of a first substrate with a power supply electrode, after a protection layer is formed thereon, provided in an embodiment of the present application.
Figure 19:
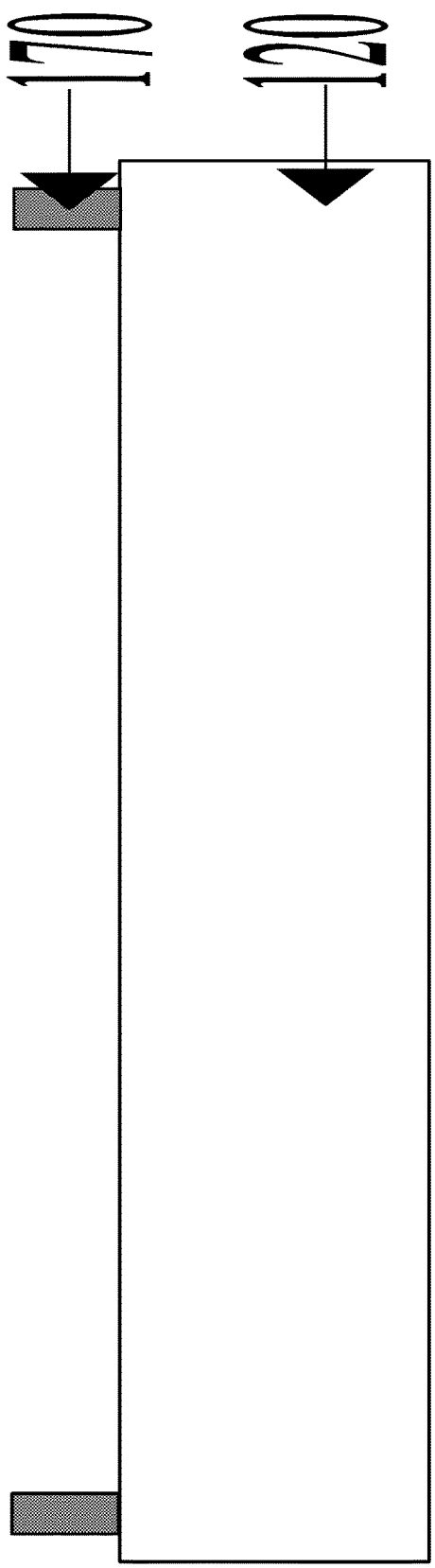
FIG. 19 is a structural schematic diagram of a second substrate, after a second alignment part is formed thereon, provided in an embodiment of the present application.
Figure 20:
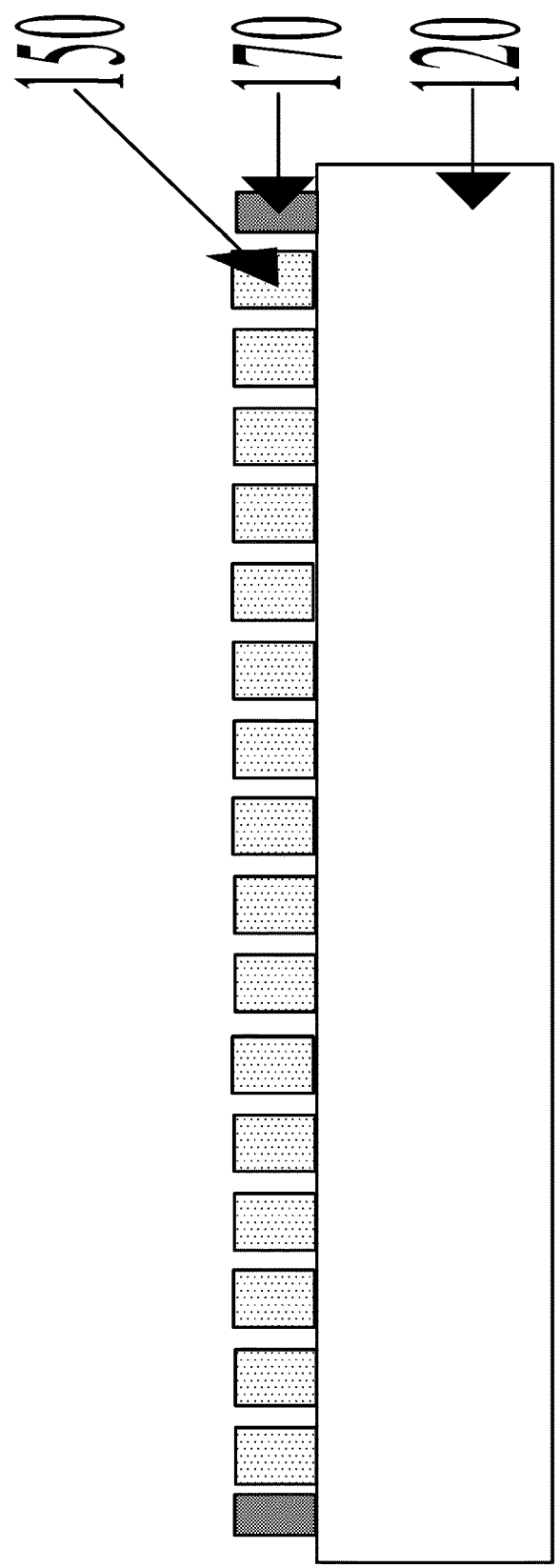
FIG. 20 is a structural schematic diagram of a second substrate with a second alignment part, after a strip electrode is formed thereon, provided in an embodiment of the present application.
Figure 21:
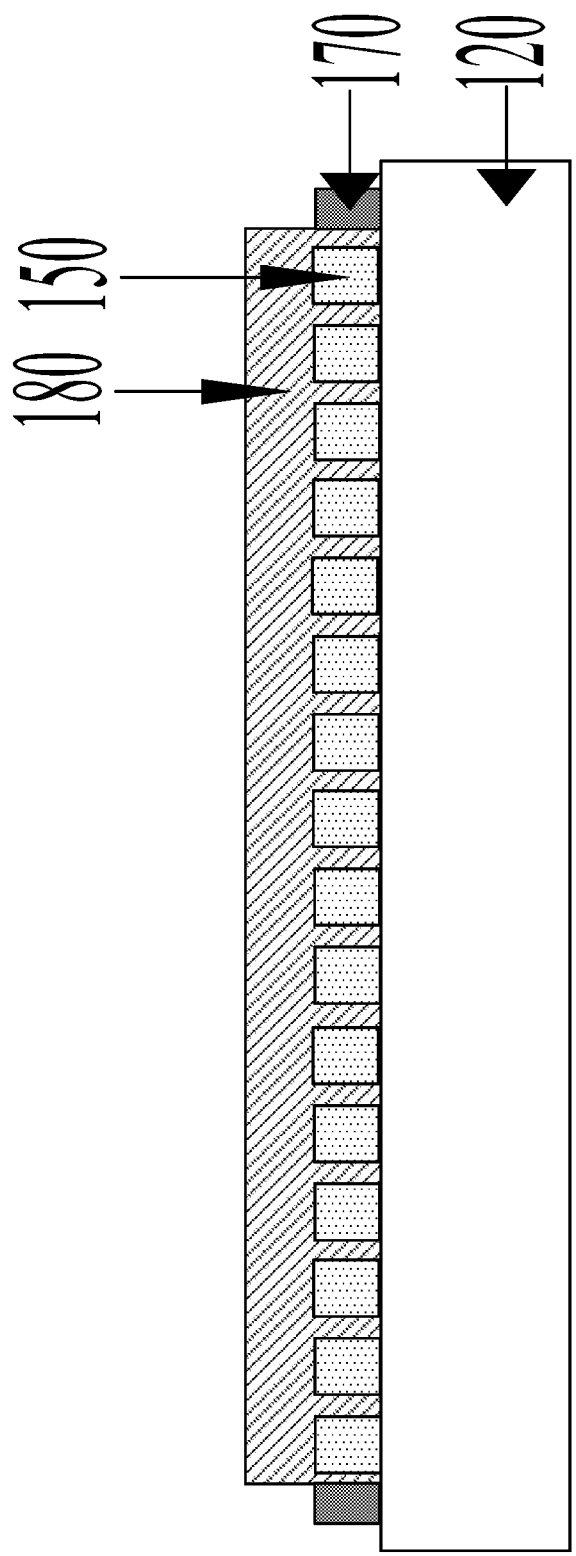
FIG. 21 is a structural schematic diagram of a second substrate with a strip electrode, after a protection layer is formed thereon, provided in an embodiment of the present application.

The manufacturing process of the grating assembly 10 provided in the embodiment of the present application may refer to FIG. 16 to FIG. 21. The manufacturing of the grating assembly 10 shown in FIG. 14 will be described herein as an example. As shown in FIG. 16, the first alignment part 160 may be formed in a peripheral region of the first substrate 110 by using a metal material. Then, as shown in FIG. 17, the power supply electrode 140 is formed on the first substrate 110 formed with the first alignment part 160 by using a semiconductor oxide (e.g., ITO). The power supply electrode 140 and the first alignment part 160 are located in the same layer. Finally, as shown in FIG. 18, the protection layer 180 is formed on the first substrate 110 formed with the power supply electrode 140 by using an inorganic insulating material such as silicon oxide, silicon nitride, and aluminum oxide. The protection layer 180 is located on the power supply electrode 140 and covers the power supply electrode 140. Then, as shown in FIG. 19, the second alignment part 170 is formed in a peripheral region of the second substrate 120 by using a metal material. As shown in FIG. 20, k strip electrodes 150 are formed on the second substrate 120 formed with the second alignment part 170 by using a semiconductor oxide. The k strip electrodes 150 and the second alignment part 170 are located in the same layer. The k strip electrodes 150 are connected in a connection manner as shown in any of FIG. 2 to FIG. 7 to form a coil. The distance between any two adjacent strip electrodes 150 in the k strip electrodes 150 conforms to the condition shown in the above formula (4). Finally, as shown in FIG. 21, the protective layer 180 is formed on the second substrate 120 formed with the strip electrodes 150 by using an inorganic insulating material such as silicon oxide, silicon nitride, and aluminum oxide. The protective layer 180 is located on the strip electrodes 150 and covers the strip electrodes 150. Then, the first substrate 110 and the second substrate 120 are disposed opposite to each other. The liquid crystal layer 130 is disposed between the first substrate 110 and the second substrate 120 to obtain the grating assembly 10 as shown in FIG. 14.

It should be noted that in the embodiments of the present application, when a spiral coil is formed by connecting the strip electrodes 150 in the connection manner shown in FIG. 6 or FIG. 7, since there are intersection lines between the connection lines, bridging may be adopted to prevent the intersecting connection lines from contacting each other. The manufacture of the grating assembly 10 shown in FIG. 14 is continued as an example. The process of forming the first alignment part 160, the power supply electrode 140, and the protection layer 180 on the first substrate 110 may refer to FIG. 16 to FIG. 18 without further description. The second alignment part, the strip electrode 150 and the protection layer 180 being formed on the second substrate 120 are taken as an example.

Figure 22:
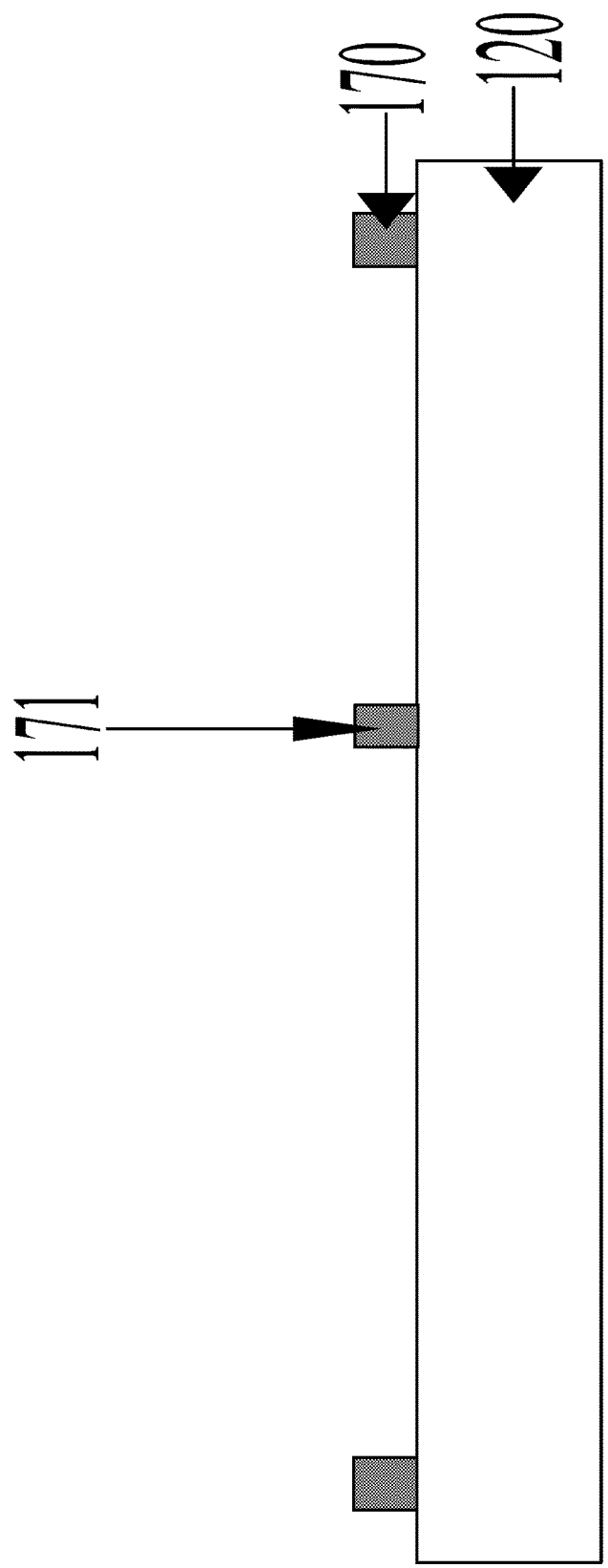
FIG. 22 is a structural schematic diagram of another second substrate, after a second alignment part is formed thereon, provided in an embodiment of the present application.
Figure 23:
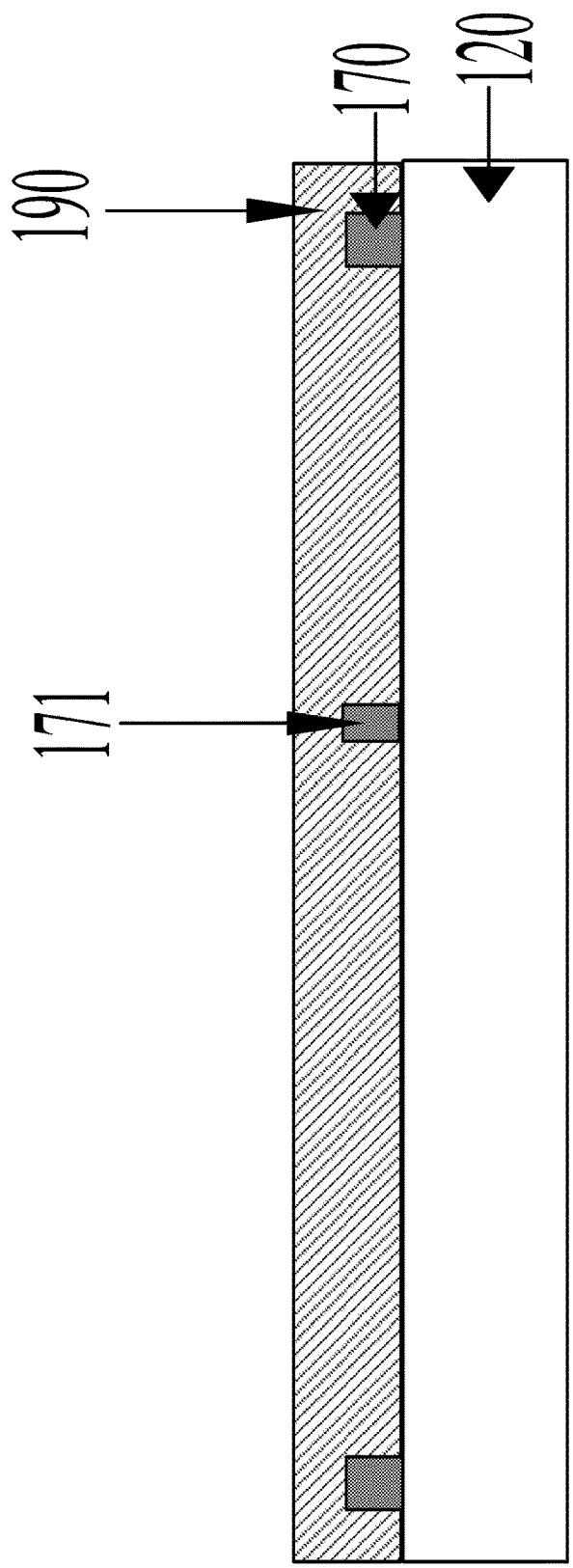
FIG. 23 is a structural schematic diagram of a second substrate with a second alignment part, after an insulating layer is formed thereon, provided in an embodiment of the present application.
Figure 24:
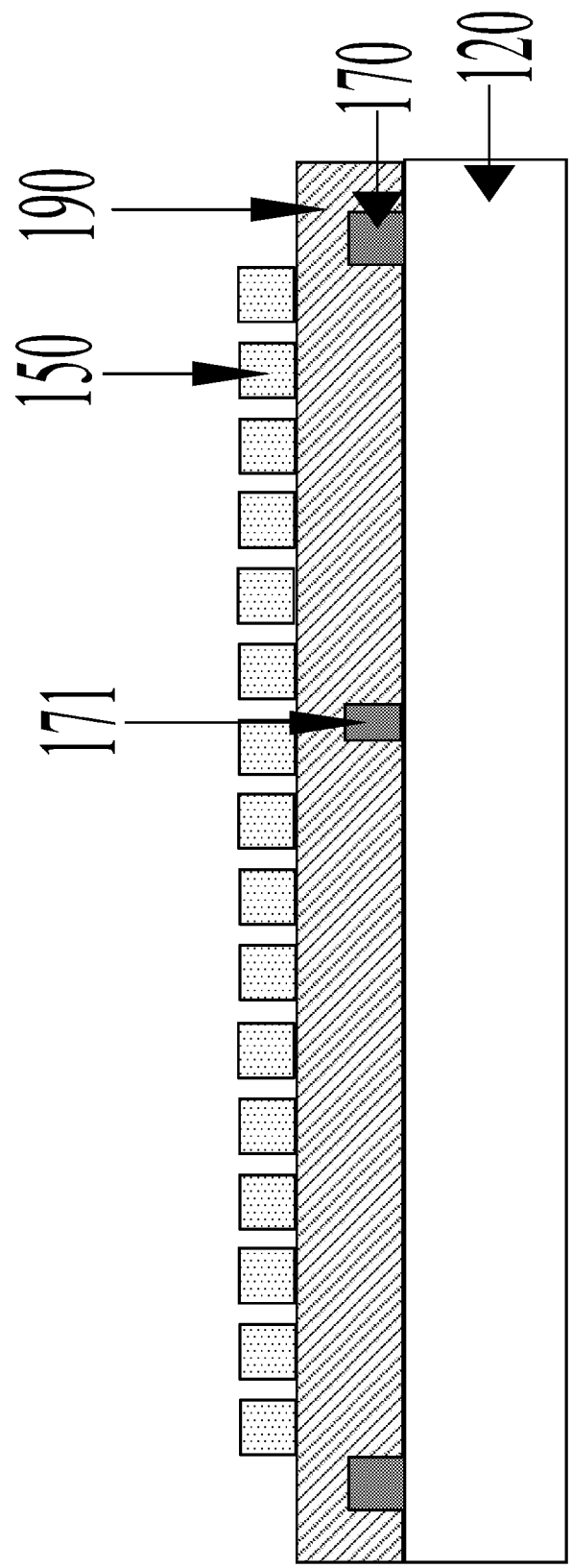
FIG. 24 is a structural schematic diagram of a second substrate with an insulating layer after a strip electrode is formed thereon provided in an embodiment of the present application.
Figure 25:
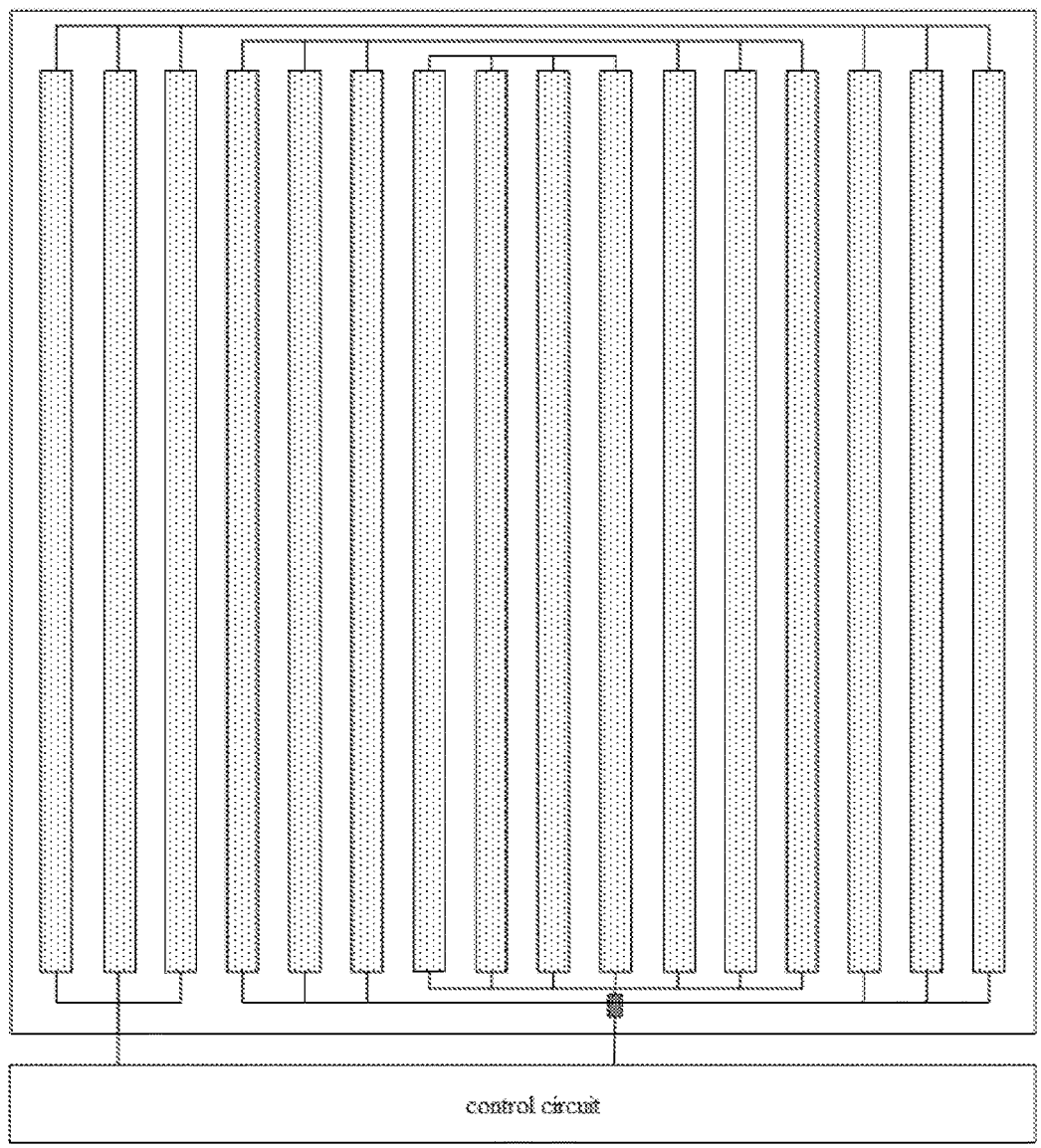
FIG. 25 is a top view of FIG. 24.
Figure 26:
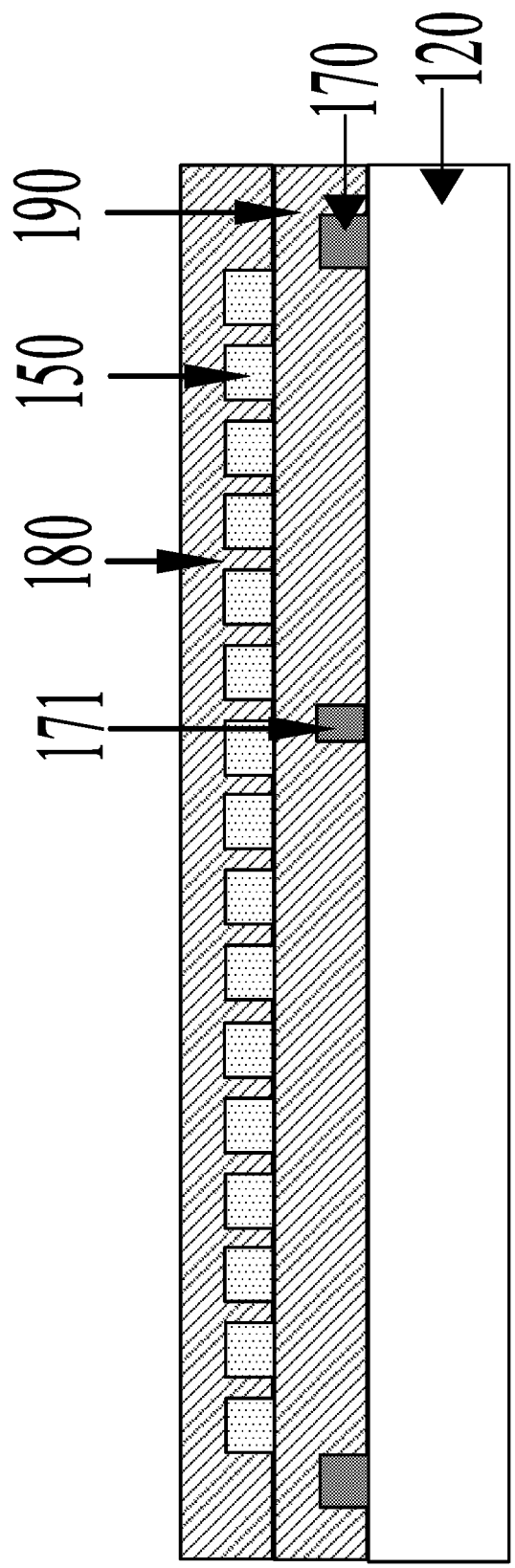
FIG. 26 is a structural schematic diagram of a second substrate with a strip electrode, after a protection layer is formed thereon, provided in an embodiment of the present application.

In some embodiments, as shown in FIG. 22, the second alignment part 170 may be formed in a peripheral region of the second substrate 120 by using a metal material. In the process of forming the second alignment part 170, a bridging part 171 may be formed on the second substrate 120. Then, as shown in FIG. 23, an insulating layer 190 is formed on the second substrate 120 formed with the second alignment part 170 and the bridging part 171 by using an inorganic insulating material such as silicon oxide, silicon nitride, or aluminum oxide. A via hole (not shown in FIG. 23) is formed on the insulating layer 190 at a region corresponding to the bridging part 171. Then, as shown in FIG. 24, k strip electrodes 150 are formed on the second substrate 120 formed with the insulating layer 190 by using a semiconductor oxide. The k strip electrodes 150 may be connected to form a spiral coil in the connection manner shown in FIG. 6. The distance between any two adjacent strip electrodes 150 among the k strip electrodes 150 conforms to the condition shown in the above formula (4). The intersecting connecting lines in the k strip electrodes 150 are bridged with the bridge part 171 through the via holes on the insulating layer 190. At this time, the top view of the second substrate 120 is as shown in the FIG. 25. Finally, as shown in FIG. 26, the protective layer 180 is formed on the second substrate 120 formed with the strip electrodes 150 by using an inorganic insulating material such as silicon oxide, silicon nitride and aluminium oxide. The protective layer 180 is located on the strip electrodes 150 and covers the strip electrodes 150. Then, the first substrate 110 and the second substrate 120 are disposed opposite to each other. The liquid crystal layer 130 is disposed between the first substrate 110 and the second substrate 120 to obtain the grating assembly 10 as shown in FIG. 14.

It should be noted that in the embodiments of the present application, the bridging part 171 and the second alignment part 170 are formed by the same patterning process, so that no additional patterning process is required to set the bridging part 171. The bridging part 171 realizes the connection between the strip electrodes 150 and ensures that the connection lines connecting the strip electrodes 150 are not contacted. That is, the bridging part is disposed on a side of the second substrate adjacent to the liquid crystal layer. The insulating layer is disposed on the bridging part. The k strip electrodes are disposed on the insulating layer. In two intersecting electrode lines in the electrode lines connecting the two strip electrode groups, one electrode line is connected to the bridging part through the via hole on the insulating layer so that the two intersecting electrode lines are insulated from each other. In the two intersecting electrode lines, the electrode lines not connected to the bridging part may cover a position on the insulating layer corresponding to the bridging part. It should also be noted that FIGS. 24 and 26 may be regarded as sectional views of FIG. 25, FIG. 24 is a sectional view before forming the protective layer 180, and FIG. 26 is a sectional view after the protective layer 180 is formed. In practical applications, the sectional view in FIG. 25 may include only the bridging part 171 or only the strip electrode 150. In the embodiment of the present application, the bridging part 171 and the strip electrode 150 are drawn in the same figure (for example, FIG. 24 or FIG. 26) for convenience of description.

In summary, in the grating assembly provided in the embodiment of the present application, since k strip electrodes are connected to form a coil, the coil can simulate a coil of an NFC antenna, so that the NFC antenna does not need to be set up in an external expansion manner. The relatively high cost problem of setting up the NFC antenna in the related art is solved, which helps to reduce the cost.

Figure 27:
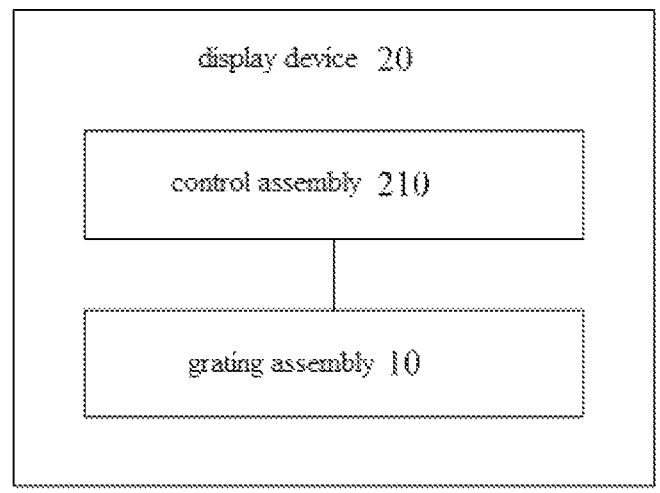
FIG. 27 is a block diagram of a display device provided in an embodiment of the present application.

Referring to FIG. 27, it shows a structural schematic diagram of a display device 20 provided in an embodiment of the present application. The display device may be an electronic paper, a mobile phone, a tablet computer, a television, a display, a laptop computer, a digital photo frame, a navigator or any other product or part with a display function. Referring to FIG. 27, the display device 20 includes: a control assembly 210 and the grating assembly 10 shown in FIG. 1 or FIG. 14. The control assembly 210 is electrically connected to the grating assembly 10.

The control assembly 210 is configured to apply a first electrical signal to a power supply electrode of the grating assembly 10, and to apply a second electrical signal to each of k strip electrodes of the grating assembly 10 so that liquid crystal between the power supply electrode and each of the strip electrodes deflects to form a grating structure.

The control assembly 210 is further configured to apply a third electrical signal to at least two of the k strip electrodes of the grating assembly 10 so that a coil formed by the k strip electrodes generates a magnetic field.

In summary, in the display device provided in the embodiment of the present application, since k strip electrodes are connected to form a coil, the coil can simulate a coil of an NFC antenna, so that the NFC antenna does not need to be set up in an external expansion manner. The relatively high cost problem of setting up the NFC antenna in the related art is solved, which helps to reduce the cost.

In some embodiments, the control assembly 210 may be a control integrated circuit (IC) of the display device. The control assembly 210 may be connected to a control circuit of the grating assembly 10. The control assembly may apply an electrical signal to the electrodes (the power supply electrode and the strip electrode) of the grating assembly 10 through the control circuit of the grating assembly 10.

Figure 28:
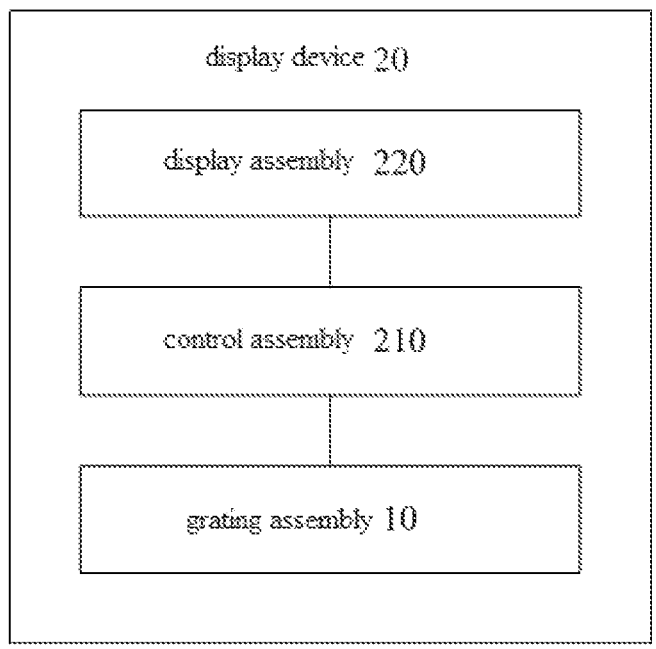
FIG. 28 is a block diagram of another display device provided in an embodiment of the present application.

In some embodiments, the display device may be a liquid crystal display device. As shown in FIG. 28, the display device 20 further includes a display assembly 220. The control assembly 210 is electrically connected to the display assembly 220. The display assembly 220 may be a display panel. The grating assembly 10 may be disposed on a side where the light exit surface of the display panel is located. The control assembly 210 is further configured to control the display assembly 220 to display an image. A grating structure formed by liquid crystals in the grating assembly 10 is configured to modulate the image displayed by the display assembly 220 to obtain a 3D image.

Figure 29:
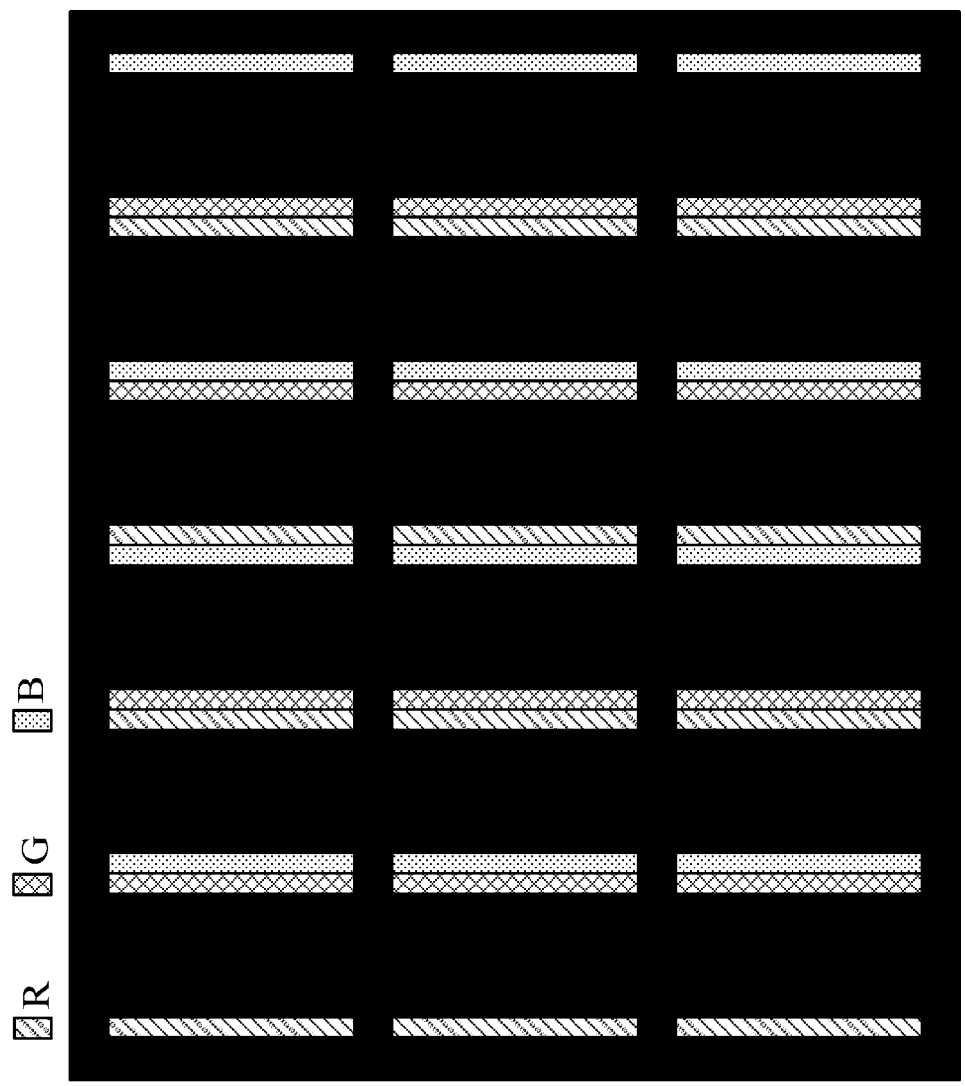
FIG. 29 is a structural schematic diagram of a display device provided in an embodiment of the present application.

In some embodiments, the control assembly 210 can apply a first electrical signal to the power supply electrode of the grating assembly 10, and apply a second electrical signal to each of the k strip electrodes of the grating assembly 10, so as to make the voltage difference between the power supply electrode and each of the strip electrodes be a preset voltage difference (for example, 5 V). Under the action of the preset voltage difference, the liquid crystals between the power supply electrode and each of the strip electrodes deflect to form a grating structure. The grating structure can block the light emitted from the light exit surface of the display panel so that the light cannot be emitted from the grating assembly 10. The liquid crystals between a region between any two grating structures and the power supply electrode do not deflect. The light can pass through the liquid crystals in that region and emit from the grating structure 10 to enter the left and right eyes of the human eyes, respectively, so that the human eyes can observe the 3D image. At this time, a structural diagram of the display device 20 may be as shown in FIG. 29, in which the black area represents that the grating structure blocks the light, and areas of red (R), green (G), blue (B) represent that the light passes through the grating assembly 10.

In the embodiment of the present application, when the user watches the display device with naked eyes, the control assembly applies a first electrical signal to the power supply electrode of the grating assembly 10, and applies a second electrical signal to each of the k strip electrodes of the grating assembly 10 so that the voltage difference between the power supply electrode and each of the strip electrodes is a preset voltage difference. The liquid crystals in the liquid crystal layer deflect to form a grating structure to realize the naked eye 3D display of the display device 20. When an NFC function is required, the control assembly 210 can apply a third electrical signal to at least two of the k strip electrodes of the grating assembly 10 so that the coil formed by the k strip electrodes generates a magnetic field. The magnetic field can be electromagnetically coupled to a magnetic field generated by the target device, thereby realizing the NFC function.

It should be noted that in the embodiments of the present application, the number of strip electrodes in each strip electrode group of the grating assembly 10 may be set according to the resolution of the display panel, the magnitude of the electrical signal that needs to be applied, and the like. For example, it is assumed that a cell phone with a resolution of 1920*1080 has 960 columns of gratings (that is, 960 strip electrodes), and the strip electrode is formed of ITO. Considering that the conductivity of ITO is not as high as that of metal, 10 strip electrodes can be chosen to connect in parallel to form a strip electrode group.

It should be further noted that in practical applications, when using the display device to implement the NFC function, the user usually does not watch the screen displayed by the display device, and therefore, whether or not the NFC recognition process affects the display of the display device, the user experience will not be affected.

In summary, in the display device provided in the embodiment of the present application, since k strip electrodes are connected to form a coil, the coil can simulate a coil of an NFC antenna, so that the NFC antenna does not need to be set up in an external expansion manner. The relatively high cost problem of setting up the NFC antenna in the related art is solved, which helps to reduce the cost.

The display device provided in the embodiments of the present application may be applied to the following method. For the method and principle for controlling the display device in the embodiments of the present application, reference may be made to the description of the following embodiments.

Figure 30:
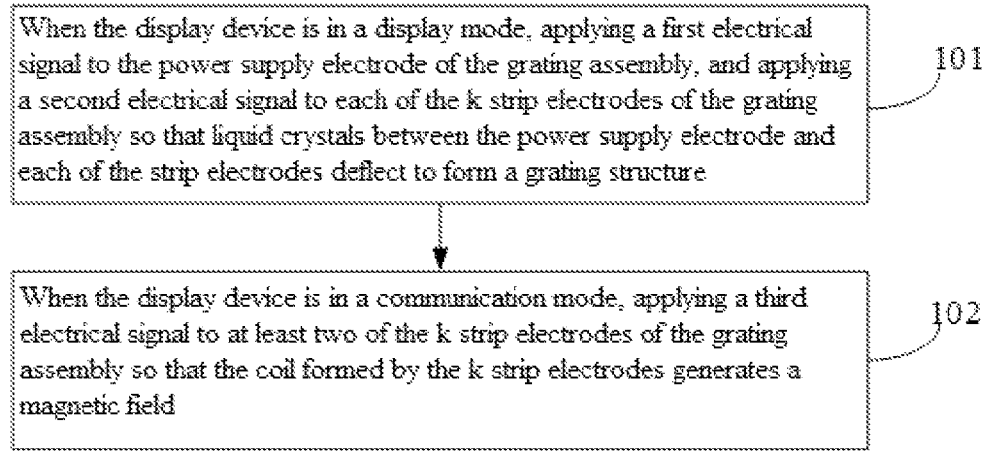
FIG. 30 is a flow chart of a method for controlling a display device provided in an embodiment of the present application.

Referring to FIG. 30, it shows a flow chart of a method for controlling a display device provided in an embodiment of the present application. The method for controlling the display device may be applied to the control assembly shown in FIG. 27 or FIG. 28, and the display device further includes a grating assembly electrically connected to the control assembly. Referring to FIG. 30, the method includes the following steps:

In step 101, when the display device is in a display mode, applying a first electrical signal to the power supply electrode of the grating assembly, and applying a second electrical signal to each of the k strip electrodes of the grating assembly so that liquid crystals between the power supply electrode and each of the strip electrodes deflect to form a grating structure.

In step 102, when the display device is in a communication mode, applying a third electrical signal to at least two of the k strip electrodes of the grating assembly so that the coil formed by the k strip electrodes generates a magnetic field.

In summary, in the method for controlling a display device provided in the embodiment of the present application, since k strip electrodes are connected to form a coil, the coil can simulate a coil of an NFC antenna, so that the NFC antenna does not need to be set up in an external expansion manner. The relatively high cost problem of setting up the NFC antenna in the related art is solved, which helps to reduce the cost.

Step 101 may specifically include: applying, by the control assembly, a first electrical signal to the power supply electrode of the grating assembly, and applying a second electrical signal to each of the k strip electrodes of the grating assembly to make the voltage difference between the power supply electrode and each of the strip electrodes be a preset voltage difference (for example, 5 V). Under the action of the preset voltage difference, the liquid crystals between the power supply electrode and each of the strip electrodes deflect to form a grating structure.

Step 102 specifically includes: applying a third electrical signal to at least two of the k strip electrodes of the grating assembly so that the coil formed by the k strip electrodes generates a magnetic field. When the strip electrodes of the grating assembly are connected to form a coil in the manner as shown in FIG. 2 or FIG. 3, the same electrical signal may be applied to the strip electrodes in the same coil, and the same or different electrical signal may be applied to the strip electrodes in different coils so that all coils can generate a magnetic field as a whole. When the strip electrodes of the grating assembly are connected to form a coil in the manner as shown in FIG. 4, FIG. 5, FIG. 6, or FIG. 7, an electrical signal may be applied to the coil shown in FIG. 4, FIG. 5, FIG. 6, or FIG. 7, so that the coil generates a magnetic field. The applied electrical signal may be a DC signal or an AC signal, which is not limited in the embodiment of the present application.

In some embodiments, the display device further includes a display assembly. The display assembly and the control assembly are electrically connected. The method further includes: when the display device is in a display mode, controlling the display assembly to display an image, and modulating, by the grating structure, the image displayed by the display assembly to obtain a 3D image.

Specifically, the control assembly may control the display assembly to display an image while the control assembly applies a first electrical signal to the power supply electrode of the grating assembly and applies a second power to each of the k strip electrodes of the grating assembly, so that the voltage difference between the power supply electrode and each of the strip electrodes is a preset voltage difference. Under the action of the preset voltage difference, the liquid crystals between the power supply electrode and each of the strip electrodes deflect to form a grating structure. The grating structure blocks the light emitted from the light exit surface of the display panel so that the light cannot be emitted from the grating assembly. The liquid crystals between a region between any two grating structures and the power supply electrode do not deflect. The light can pass through the liquid crystals in that region and emit from the grating assembly to enter the left and right eyes of the human eyes, respectively, enabling the human eyes to observe the 3D image.

In summary, in the method for controlling a display device provided in the embodiment of the present application, since k strip electrodes are connected to form a coil, the coil can simulate a coil of an NFC antenna, so that the NFC antenna does not need to be set up in an external expansion manner. The relatively high cost problem of setting up the NFC antenna in the related art is solved, which helps to reduce the cost.

The embodiments of the present application further provide a display device. The display device may be a terminal, such as a smart phone, a tablet computer and the like. The display device includes:

a processing component;

a memory for storing executable instructions executed by the processing component;

and a grating assembly shown in FIG. 1 or FIG. 14;

wherein the processing assembly is configured to:

when the display device is in a display mode, apply a first electrical signal to the power supply electrode of the grating assembly, and apply a second electrical signal to each of the k strip electrodes of the grating assembly so that liquid crystals between the power supply electrode and each of the strip electrodes deflect to form a grating structure; and when the display device is in a communication mode, apply a third electrical signal to at least two of the k strip electrodes of the grating assembly so that a coil formed by the k strip electrodes generates a magnetic field.

Exemplarily, the processing component may be a processor or a processing chip.

In some embodiments, the processing component is configured to:

when the display device is in a display mode, control the display component of the display device to display images, and the grating structure formed by the grating assembly is configured to modulate the images displayed by the display component to obtain 3D images.

The embodiments of the present application further provide a readable storage medium including instructions stored therein. The readable storage medium, when operating on the control assembly, causes the control assembly to implement the method for controlling the display device shown in FIG. 30.

The embodiments of the present application further provide a chip including at least one of a programmable logic circuit and a program instruction. The chip operates to implement the method for controlling the display device shown in FIG. 30.

Persons of ordinary skill in the art can understand that all or part of the steps described in the above embodiments can be completed through hardware, or through relevant hard instructed by application stored in a non-transitory computer readable storage medium, such as read-only memory, disk or CD, etc.

The foregoing are only optional embodiments of the present application, and are not intended to limit the present application. Within the spirit and principles of the application, any modifications, equivalent substitutions, improvements, etc., are within the scope of protection of the present application.

What is claimed is:

1. A control method for a display device, wherein a control assembly is applied in the display device, the display device further comprises a grating assembly, the grating assembly is electrically connected to the control assembly, and the grating assembly comprises: a first substrate and a second substrate disposed opposite to each other, and a liquid crystal layer disposed between the first substrate and the second substrate, the first substrate is provided with a power supply electrode on a side adjacent to the liquid crystal layer, the second substrate is provided with k strip electrodes on a side adjacent to the liquid crystal layer, the k strip electrodes are connected to form a coil, k>1, and k is a natural number, and the method comprises:

when the display device is in a display mode, applying a first electrical signal to the power supply electrode of the grating assembly, and applying a second electrical signal to each of the k strip electrodes of the grating assembly so that liquid crystals between the power supply electrode and each of the strip electrodes deflect to form a grating structure; and when the display device is in a communication mode, applying a third electrical signal to at least two of the k strip electrodes of the grating assembly so that the coil formed by the k strip electrodes generates a magnetic field.

2. The method of claim 1, wherein the display device further comprises a display assembly electrically connected to the control assembly, and the method further comprises:

when the display device is in the display mode, controlling the display assembly to display an image, and modulating, by the grating structure, the image displayed by the display assembly to obtain a three-dimensional image.

3. A grating assembly, comprising: a first substrate and a second substrate disposed opposite to each other, and a liquid crystal layer disposed between the first substrate and the second substrate, the first substrate being provided with a power supply electrode on a side adjacent to the liquid crystal layer, the second substrate being provided with k strip electrodes on a side adjacent to the liquid crystal layer, the k strip electrodes being connected to form a coil, k>1, and k being a natural number, wherein the power supply electrode is configured to receive a first electrical signal, each of the k strip electrodes is configured to receive a second electrical signal, liquid crystals between the power supply electrode and each of the strip electrodes are configured to deflect to form a grating structure after the power supply electrode receives the first electrical signal and each of the strip electrodes receives the second electrical signal, and at least two of the k strip electrodes are further configured to receive a third electrical signal so that the coil formed by the k strip electrodes generates a magnetic field.

4. The grating assembly of claim 3, wherein length directions of the k strip electrodes are parallel, the k strip electrodes are arrayed along a first direction, and the first direction intersects with the length direction of each of the k strip electrodes.

5. The grating assembly of claim 4, wherein the first direction is perpendicular to the length direction of each of the k strip electrodes.

6. The grating assembly of claim 4, wherein the grating assembly comprises m strip electrode groups arrayed in the first direction, each of the strip electrode groups comprises at least one of the strip electrodes, at least one of the strip electrode groups is a strip electrode group formed by a parallel connection of at least two of the strip electrodes, an i-th strip electrode group and a (m+1−i)-th strip electrode group of the m strip electrode groups are different, a first end of the i-th strip electrode group is connected to a first end of the (m+1−i)-th strip electrode group, a second end of the i-th strip electrode group and a second end of the (m+1−i)-th strip electrode group are respectively configured to receive an electrical signal, the electrical signal comprises the third electrical signal, m>1, 0<i≤m/2, and both m and i are natural numbers.

7. The grating assembly of claim 4, wherein a j-th strip electrode in the k strip electrodes is different from a (k+1−j)-th strip electrode, a first end of the j-th strip electrode is connected to a first end of the (k+1−j)-th strip electrode, a second end of the j-th strip electrode and a second end of the (k+1−j)-th strip electrode are respectively configured to receive an electrical signal, the electrical signal comprises the third electrical signal, 0<j≤k/2, and j is a natural number.

8. The grating assembly of claim 4, wherein the grating assembly comprises g strip electrode groups arrayed in the first direction, each of the strip electrode groups comprises at least one of the strip electrodes, at least one of the strip electrode groups is a strip electrode group formed by a parallel connection of at least two of the strip electrodes, a first end of a w-th strip electrode group in the g strip electrode groups is connected to a first end of a (w+1)-th strip electrode group, a second end of the (w+1)-th strip electrode group is connected to a second end of the (w+2)-th strip electrode group, a second end of the first strip electrode group and a second end of the g-th strip electrode group in the g strip electrode groups are respectively configured to receive an electrical signal, the electrical signal comprises the third electrical signal, g>1, 0<w≤g−2, and both g and w are natural numbers.

9. The grating assembly of claim 4, wherein a first end of a u-th strip electrode in the k strip electrodes is connected to a first end of a (u+1)-th strip electrode, a second end of the (u+1)-th strip electrode is connected to a second end of the (u+2)-th strip electrode, a second end of the first strip electrode in the k strip electrodes and a second end of the k-th strip electrode are respectively configured to receive an electrical signal, the electrical signal comprises the third electrical signal, 0<u≤k−2 and u is a natural number.

10. The grating assembly of claim 4, wherein the grating assembly comprises n strip electrode groups arrayed in the first direction, each of the strip electrode groups comprises at least one of the strip electrodes, at least one of the strip electrode groups is a strip electrode group formed by at least two of the strip electrodes parallel connected, a p-th strip electrode group and a (n+1−p)-th strip electrode groups in the n strip electrode groups are different, the (n+1−p)-th strip electrode group is different from a (p+1)-th strip electrode group, a first end of the p-th strip electrode group is connected to a first end of the (n+1−p)-th strip electrode group, a second end of the (n+1−p)-th strip electrode group is connected to a second end of the (p+1)-th strip electrode group, one end of the n strip electrode groups that is not connected to other strip electrode groups is configured to receive an electrical signal, the electrical signal comprises the third electrical signal, n>1, 0<p<n, and n and p are both natural numbers.

11. The grating assembly of claim 4, wherein a q-th strip electrode in the k strip electrodes is different from a (k+1−q)-th strip electrode, the (k+1−q)-th strip electrode is different from the (q+1)-th strip electrode, a first end of the q-th strip electrode is connected to a first end of the (k+1−q)-th strip electrode, a second end of the (k+1−q)-th strip electrode is connected to a second end of the (q+1)-th strip electrode, one end of the k strip electrodes that is not connected to other strip electrodes is configured to receive an electrical signal, the electrical signal comprises the third electrical signal, 0<q<k, and the q is a natural number.

12. The grating assembly of claim 3, wherein a first alignment part is disposed in a peripheral region of the first substrate on a side adjacent to the liquid crystal layer, a second alignment part is provided in a peripheral region of the second substrate on a side adjacent to the liquid crystal layer, and the first alignment part and the second alignment part are configured to align the first substrate and the second substrate.

13. The grating assembly of claim 3, wherein a protective layer is respectively provided on the power supply electrode and on the k strip electrodes.

14. The grating assembly of claim 13, wherein the protective layer is made of an inorganic insulating material, and the materials of the power supply electrode and the strip electrode are both semiconductor oxide.

15. The grating assembly of claim 3, wherein the power supply electrode is a plate electrode.

16. The grating assembly of claim 3, wherein the grating assembly is applied to a liquid crystal display device, a distance between any two adjacent strip electrodes is G, each pixel in the liquid crystal display device comprises three sub-pixels, each pixel has a width P, a distance between two pupils of human eyes is L, and G, P and L satisfy:

$$G = \frac{2 \times P}{1 + \frac{P}{L}}.$$

17. A display device, comprising: a control assembly and a grating assembly of claim 3, the control assembly being electrically connected to the grating assembly, wherein
the control assembly is configured to apply a first electrical signal to a power supply electrode of the grating assembly, and apply a second electrical signal to each of k strip electrodes of the grating assembly, so that liquid crystals between the power supply electrode and each of the strip electrodes deflect to form a grating structure; and
the control assembly is further configured to apply a third electrical signal to at least two of the k strip electrodes of the grating assembly so that a coil formed by the k strip electrodes generates a magnetic field.

18. The display device of claim 17, further comprising: a display assembly, the control assembly being electrically connected to the display assembly, wherein
the control assembly is further configured to control the display assembly to display an image, and the grating structure is configured to modulate the image displayed by the display assembly to obtain a three-dimensional image.

19. A display device, comprising:
a processing assembly;
a memory for storing executable instructions of the processing assembly; and
a grating assembly of claim 1;
wherein the processing assembly is configured to:
when the display device is in a display mode, apply a first electrical signal to the power supply electrode of the grating assembly, and apply a second electrical signal to each of the k strip electrodes of the grating assembly so that liquid crystals between the power supply electrode and each of the strip electrodes deflect to form a grating structure; and
when the display device is in a communication mode, apply a third electrical signal to at least two of the k strip electrodes of the grating assembly so that a coil formed by the k strip electrodes generates a magnetic field.

20. A readable storage medium storing instructions, wherein when the readable storage medium runs on a control assembly, the control assembly executes a control method for a display device, the method comprising:
when the display device is in a display mode, applying a first electrical signal to the power supply electrode of the grating assembly, and applying a second electrical signal to each of the k strip electrodes of the grating assembly so that liquid crystals between the power supply electrode and each of the strip electrodes deflect to form a grating structure; and
when the display device is in a communication mode, applying a third electrical signal to at least two of the k strip electrodes of the grating assembly so that a coil formed by the k strip electrodes generates a magnetic field.

* * * * *